United States Patent [19]

Kimura

[11] Patent Number: 5,734,906
[45] Date of Patent: Mar. 31, 1998

[54] DEVICE FOR OUTPUTTING INITIAL VALUES OF DATA STATEMENT AT HIGH SPEED BY USING A PROPER WORK AREA

[75] Inventor: Yukihiro Kimura, Kawasaki, Japan

[73] Assignee: Fujitsu Limited, Kawasaki, Japan

[21] Appl. No.: 596,701

[22] Filed: Feb. 5, 1996

Related U.S. Application Data

[63] Continuation-in-part of Ser. No. 215,602, Mar. 22, 1994, abandoned.

[30] Foreign Application Priority Data

Jun. 29, 1993 [JP] Japan ................................ 5-158560

[51] Int. Cl.$^6$ ................................................ G06F 9/45
[52] U.S. Cl. .......................... 395/705; 395/707; 395/708
[58] Field of Search .................................. 395/700, 705, 395/708, 707

[56] References Cited

U.S. PATENT DOCUMENTS

| 4,667,290 | 5/1987 | Goss et al. ............................ 364/300 |
| 5,325,531 | 6/1994 | McKeeman et al. .................... 395/700 |

FOREIGN PATENT DOCUMENTS

| 1-207827 | 8/1989 | Japan . |
| 3-070038 | 3/1991 | Japan . |
| 3-071233 | 3/1991 | Japan . |

OTHER PUBLICATIONS

"The Art of Computer Programming", Addison–Wesley, 1968 pp. 251–265.
Varga, et al, ed; *The Art of Computer Programming;* Addison–Wesley; 1968; 251–265.

Primary Examiner—Alvin E. Oberley
Assistant Examiner—Kakali Chaki
Attorney, Agent, or Firm—Staas & Halsey

[57] ABSTRACT

A device which outputs initial values of a data statement corresponding to a source program that has been converted into an intermediate program. The intermediate program contains initial value data corresponding to the initial values of the data statement. A taking-out mechanism takes out the initial value data from the intermediate program. An initial value storing mechanism prepares an initial value storage table and sets the initial value data taken out by the taking-out mechanism in the initial value storage table. An object program output mechanism generates an object program based on the initial value data set in the initial value storage table. The initial value storing mechanism sets an iteration count of the initial values in the initial value storage table, and increases the iteration count in correspondence with the respective initial values so that the initial values can be stored in the initial value storage table.

20 Claims, 21 Drawing Sheets

FIG. 1A PRIOR ART

```
PROGRAM EXAMPLE
INTEGER A(3)
DATA A(2)/2/
DATA A(3)/3/
DATA A(1)/1/
END
```

FIG. 1B PRIOR ART

```
ADDRESS 4: 0×00000002
ADDRESS 8: 0×00000003
ADDRESS 0: 0×00000001
```

```
PROGRAM EXAMPLE 2
INTEGER A(10000000)
DATA A(1)/1/
END
```

OBJECT FILE

```
· word  0X00000001  *1
· skip  39999996    *2
```

*1 ASSIGN VALUE 1(4 BYTES)
*2 ASSIGN 39999996 BYTES

DEVICE FOR OUTPUTTING INITIAL VALUES OF DATA STATEMENT AT HIGH SPEED BY USING A PROPER WORK AREA

This application is a continuation of application Ser. No. 08/215,602, filed Mar. 22, 1994, now abandoned.

BACKGROUND OF THE INVENTION

1. Field of the Invention

This invention relates to a device for outputting the initial values of a data statement at high speed in response to a source program by using an appropriate work area in a compiler which translates and processes the source program.

2. Description of the Prior Art

The compiler outputs assembly instructions or object modules in the translating process (the assembly instructions or object modules are hereinafter called simply the object). The initial values of the data statement of FORTRAN are also output in the form of the object decided by the system. And, the initial values of the data statement are assigned to somewhere in the storage area.

In outputting the initial values of the data statement, there are (1) those which must be output in the assignment order, and (2) those which are output regardless of the assignment order, and are re-aligned by the assembler or the linkage editor in the assignment order.

For example, in the example of the FORTRAN program as shown in FIG. 1A, the object generated by the above-mentioned (2) and the object generated by (1) become as shown in FIGS. 1B and 1C, respectively.

In the program example as shown in FIGS. 1A, 1B and 1C, the initial values are given to the respective elements of array A, but the order of giving the initial value (to be given in the order expressed in the data statement) is different from that of the assignment position.

The object in the format (above-mentioned (2) in FIG. 1B) has the information on the assignment position in addition to the initial values, the order of outputting the object is the same as the order of giving the initial values, and the assembler or the linkage editor re-aligns it in the order of assignment on the basis of the information on the assignment position. On the other hand, the object in the format (above-mentioned (1)) in FIG. 1C outputs in the order of assignment from the beginning.

In other words, what is shown in (2) has the assignment position in addition to the actual initial values while what is shown in (1) outputs the object in the assignment order.

The subject of this invention is the compiler which outputs the object that must output the initial values in the case of above-mentioned (1) (the format of FIG. 1C), i.e., in the assignment order.

There are largely two methods to output the object in the assignment order.

1) The first method first of all prepares the work area which has the same size as the variables (arrays) to which the initial values are given. Next, the initial values are buried into this work area in the order of initial values given. When all the initial values are completely buried, the object is output by referring to this work area in order from the top.

FIG. 2 shows the process to output the initial values of the data statement to the object file by using the work area having the same size as the variables (arrays) which appeared in the data statement in the program example as shown in FIG. 1A.

In FIG. 2, the work area is prepared in (1) and the initial value data A/(2)/which is first given in the work area in (2) is set. The initial value of data A (3)/3/is set in the work area in (3). Then, the initial value of data A (1)/1/is set in the work area in (4). The object is output to the file by referring to the contents in the work area in (5).

The above method has the following two problems:

The first problem occurs when the initial values are set in a giant array. For example, as shown in the program example in FIG. 3A, it is the case when the integer type array A (10000000) is declared and when the initial values are set to only the element of A (1).

In this case, as shown in FIG. 3B, the initial values are given to only one element (4 bytes), and the remaining area of 39999996 is not used.

In such a case, the work area is wasted, and it takes time to acquire the work area. In the FORTRAN with the specifications of turning the part which is not given the initial value to 0, the time to clear the whole work area to 0 is also required. Furthermore, it is considered that the compiling may fail as the work area is not secured.

The second problem is caused in the compiler which outputs the assembly instruction as the object.

In the assembly instruction of a certain system, the area of the size can be assigned to the part where the initial values are not given with one assembly instruction.

Most of the systems have this instruction. By using this instruction, the larger area can be easily assigned. Because of one instruction, the size of the object becomes smaller. Therefore, it is essential to output this instruction to the part to which the initial values are not given.

FIG. 4 shows the case where the area is assigned by the assembly instruction in the program example in FIG. 3A. In the Figure, the initial values are set with *1 and the area is secured with *2.

In this case, the part to which the initial values were not given by the assembly instruction in a system can be expressed by one instruction. However, it is difficult to know to which part the initial values are given by only referring to the work area where the initial values were buried. Therefore, when the initial values are buried in the work area, an additional information is required to inform in which part the initial values were buried.

FIG. 5 shows the additional information to inform the above-mentioned initial value setting. As shown in the Figure, the additional information is prepared and is marked (indicated with ON in the Figure) to inform that the initial value was set. In this case, the additional information requires 1 bit for 1 byte of initial value. In this example, 50000000 bytes are required.

In this case the time and area to prepare this information as well as the time to refer to this information when the object is output are required.

2) The second method to output the object in the assignment order is to, first of all, prepare the initial value storage table when the initial values are given. This table has (1) the chain of the tables, (2) the initial value, and (3) the initial value assignment position. This table is prepared every time when the initial values are given, and the tables are chained to be saved.

FIG. 6 shows the table to store the given initial value in the example of the program in FIG. 1A. The size of one table is 12 bytes. In the Figure, (1), (2) and (3) show the chain of tables, the initial value, and the initial value assignment position, respectively. The tables are chained in the order of the given initial values and are sorted in the assignment order when they are output. Or they are chained by sorting them in the assignment order.

The problem of this second method is that when the number of initial value setting increases, the number of tables to store the initial value increases, and securing the work area for table generation becomes a huge task. It is also a problem that sorting the tables in the assignment order requires longer time and the compiling time increases.

SUMMARY OF THE INVENTION

The present invention is intended to overcome the above problems of the conventional technology, and is assuming the method in the above-mentioned 2) as the precondition.

An object of the present invention is to reduce the size of the required work area by reducing the number of initial value storage tables, and to provide the device to output the initial values of the data statement which does not require re-alignment of the storage tables and reduces the time to output them to the object file.

Another object of the present invention is to provide the device to output the initial values of the data statement which can reduce the number of initial value storage tables even when the initial values are set with constant intervals of space.

The above objects of the present invention are achieved by a device for outputting output initial values in a compiler which outputs initial values of data statement corresponding to a source program and generates an object program, the device comprising:

taking-out means for taking out initial value data from an intermediate program obtained from the source program;

initial value storing means for preparing a initial value storage table and setting the initial value data taken out by the taking-out means in an initial value storage table; and object program output means for generating an object program based on the initial value data set in the initial value storing table, the initial value storing means setting the iteration count of initial values related to the initial value data in the initial value storage table, and increasing the iteration count corresponding to the number of the initial values so that the initial values can be stored in the initial value storage table.

BRIEF DESCRIPTION OF THE DRAWINGS

FIGS. 1A, 1B and 1C are diagrams illustrating the output format of the object;

DESCRIPTION OF THE PREFERRED EMBODIMENTS

FIG. 1 shows the principle block of this invention. In the Figure, 7 indicates a source program; 2 indicates an intermediate program generated by the source program; 3 indicates a means for taking out the initial value data such as the value and length of the initial values; 4 indicates a means for storing the initial value which prepares the initial value storage table, and setting the taken-out initial value data, assignment position, etc. to the initial value storage table; 5 indicates object program output means generating and outputting the object program on the basis of initial value data set on an initial value storage table; 6 indicates an initial value storage table in which the initial value data, the iteration count 6a and the length of space 6b, etc. are set; 7 indicates a generated object program; 8 is head/end pointer retaining means retaining the head and end pointers which point to the head and end positions, respectively, in the initial value storage table; and 9 is means for changing or dividing the initial value storage table when the initial values are set in the same area several times.

Figure 7:
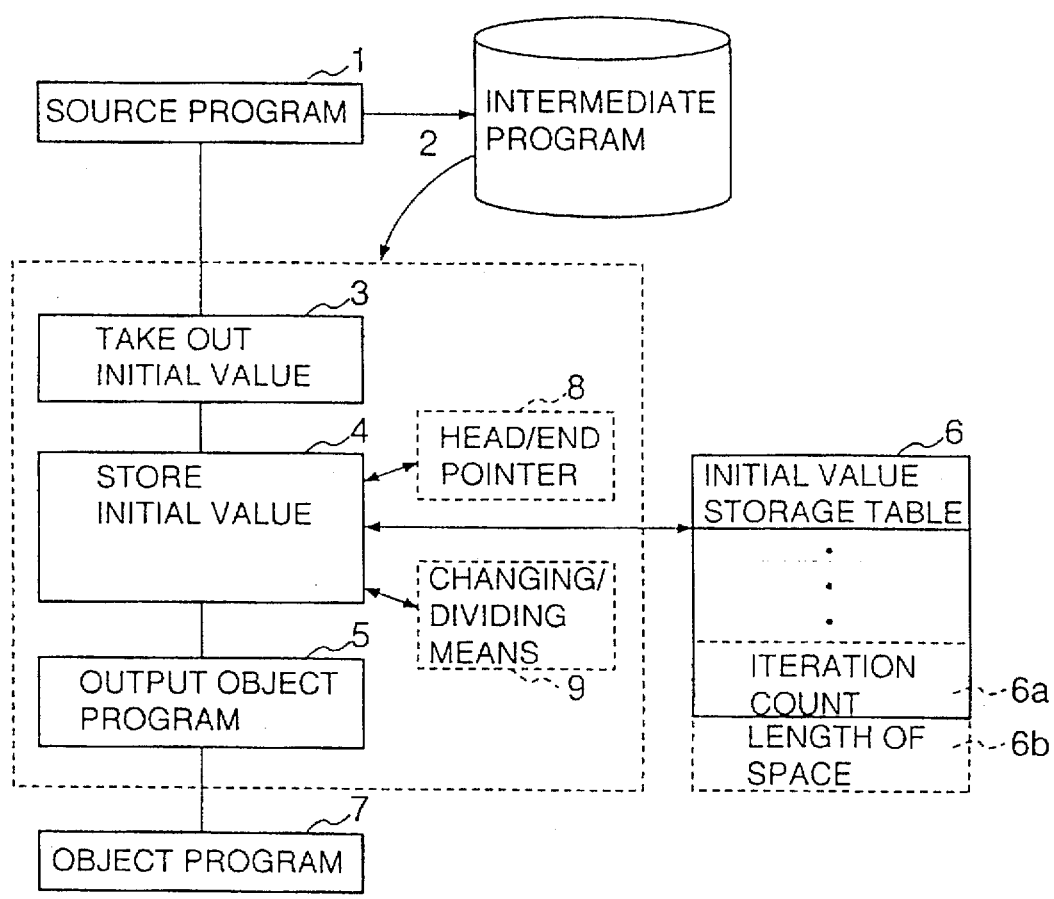
FIG. 7 is a block diagram of the principle of the present invention.

In order to solve the above problems, as shown in FIG. 7, according to a first aspect of the present invention, it is configured to store a plurality of initial values on one initial value storage table 6 so that the initial value storing means 4 sets the number 6a of repetition of initial values in the initial value storage table 6 and increases the number 6a of repetition on the basis of the number of the initial values.

According to a second aspect of this invention, it is configured to store a plurality of initial values into one initial value storage table by setting the length of space 6b in the above-mentioned initial value storage table in setting the initial value with constant intervals of space in the first aspect of the invention.

According to a third aspect of the present invention, it is configured to omit re-alignment of the tables by providing means 8 for retaining the head and end pointers which indicate the head and end positions of initial value storage table 6, and renewing the above-mentioned head and end pointers in inserting or adding the prepared storage table to the head or end of the chain of the storage tables in the first or second aspect of the invention.

According to a fourth aspect of the invention, it is configured so that there is provided means 9 for changing or dividing the initial value storage table when the initial values are set several times in the same area in the first, second or third aspect of the invention.

In order to solve the problems of the conventional technology, reduction of the number of initial value storage tables to be generated is considered. Here, how to describe the source program is noted. The reason that the number of initial values becomes huge is that the initial values can be given to the variable (array) in the format of DO implied list in the data statement, and that the iteration count can be described in the initial value. In the description of the data text other than this, the number of initial value setting does not pose a problem. In other words, the number of initial values that can be described manually (or be even mechanically generated) does not regard the size of the work area and the compiling time as the problem.

For example, in the PROGRAM EXAMPLE 3 of the following program examples, a huge amount of initial values can be given by designating the DO implied list and the iteration count. However, in the description of PROGRAM EXAMPLE 4, the number of initial value setting does not pose a problem.

| Example: | PROGRAM EXAMPLE 3 |
| | INTEGER A(10000000) |
| | DATA A(I), I=1,10000000) /5000000*1,500000*2/ |
| | END |
| Example: | PROGRAM EXAMPLE 4 |
| | INTEGER A(10000000) |
| | DATA(A(I), A(101), A(132), A(1000), A(12345), |
| | A(1000000) /1, 2, 3, 4, 5, 6/ |
| | END |

The following example shows the case to serially give the initial values and the case to non-serially give the initial values. Array A gives the initial values serially while array B gives the initial values non-serially. In other words, in array B, the initial value "1" is assignment 500 times per 1 every other one.

| Example: | PROGRAM EXAMPLE 5 |
| | INTEGER A(10000), B(1000) |
| | DATA (A(I), I=1, 1000) /1000*1/ |
| | DATA (B(I), I=1, 1000, 2) /500*1/ |
| | END |

In the description of the data statement using the DO implied list and the iteration count, the initial values with the same value are often serially output (to the serially assignment positions) as shown in array A in the above-mentioned example. On the other hand, by designating the incremental value till the next element to the DO implied list, as shown in array B in the above-mentioned example, the initial value can be output to the non-serial positions. However, it is generally known that the source program that is described to serially refer to the area is faster.

On the basis of the above-mentioned idea, the first aspect of the invention prioritizes the case to serially give the initial values as mentioned above. The second aspect of the invention is intended to add the mechanism to reduce the number of initial value storage tables generated when the initial values are given non-serially at constant intervals.

To reduce the required work area, it is necessary to reduce the number of initial value storage tables to be prepared.

Therefore, as shown in FIG. 7, the initial value storage table 6 is made to be able to set the iteration count of initial value 6a. And as the initial values are given, 1 is added to the above-mentioned iteration count. By creating this kind of mechanism, a plurality of initial values can be saved in one initial value storage table 6.

However, when the initial values are given non-serially at constant intervals, the above-mentioned mechanism requires a plurality of initial value storage tables. Thus, the initial value storage table is made to be able to set the length of space 6b. And, when the initial values are given non-serially at constant intervals, the length to which the initial values are not given is set to the length of space 6b. This will allow to store a plurality of initial values in one initial value storage table even when the initial values are given non-serially at constant intervals.

This invention has reduced the number of initial value storage tables to be prepared on the basis of the above-mentioned principle. In the first aspect of the invention, the iteration count of initial value 6a is set to the initial value storage table 6, and the above-mentioned iteration count is made to increase in response to the number of initial values. Thus, when the initial values are given serially, a plurality of initial values can be saved in one initial value storage table 6, and the work area in giving the initial value can be made smaller, and the time to output the initial values to the object file can be reduced.

In the second aspect of the invention, since the length of space 6b is set to the above-mentioned initial value storage table 6 in the first aspect of the invention, the same effect as that of the first aspect of the invention can be obtained and a plurality of initial values can be saved in one initial value storage table when the initial values are set with constant intervals of space.

In the third aspect of the invention, since the means 8 to retain the head and end pointers which indicate the head and end positions of initial value storage table 6 is created, and the above-mentioned head and end pointers are renewed in inserting at or adding the prepared storage table to the head or end of the chain of the storage tables, the re-alignment of the tables can be omitted.

In the fourth aspect of the invention, since the means 9 to change or divide the initial value storage table 6 is created in the first, second or third aspect of the invention, it is possible to respond to the a plurality of setting of initial values in the same area.

Figure 8:
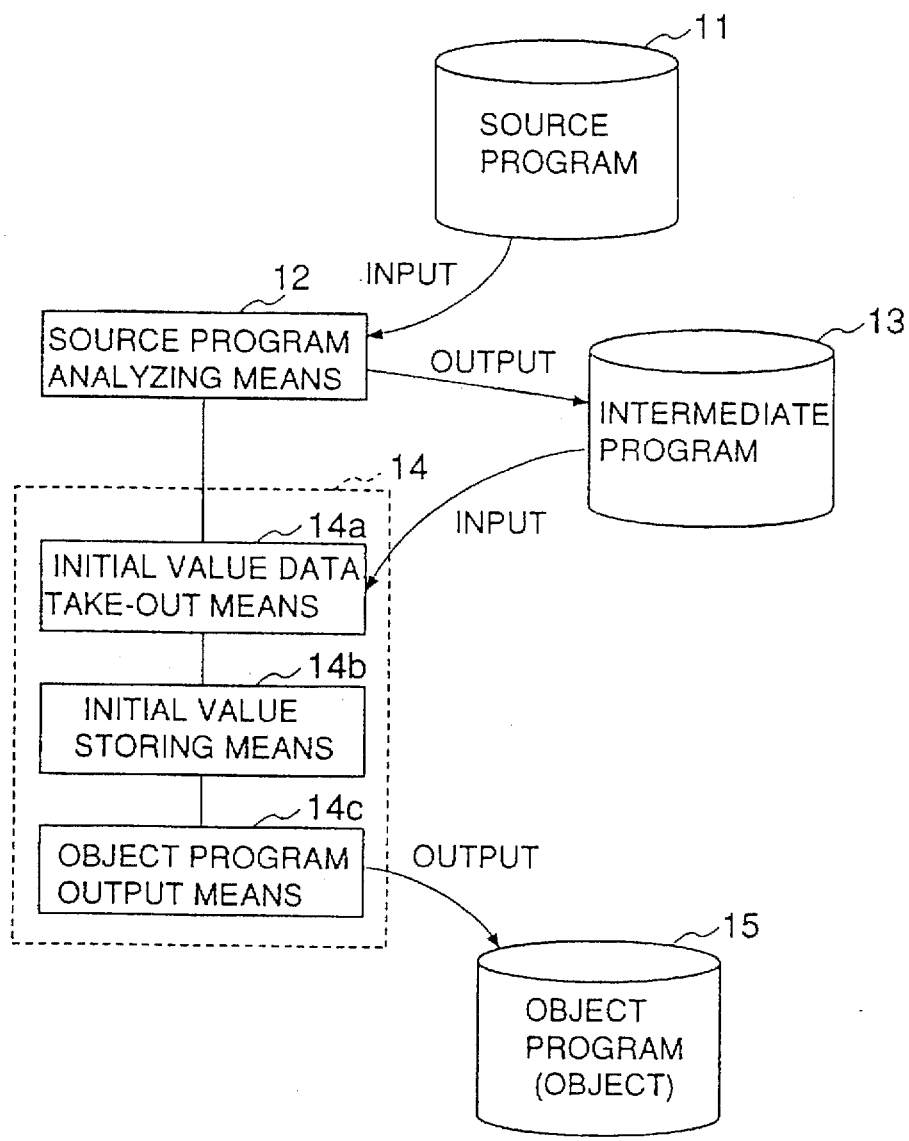
FIG. 8 is a block diagram illustrating the configuration of the compiler which is the subject of the present invention.

FIG. 8 shows the configuration of the compiler which is the subject of this invention. In the Figure, 11 is the file which stores the source program subject to compilation; 12 is the source program analyzing means to analyze the structure of the source program and generate the intermediate program; and 13 is the file to store the intermediate program generated. 14 is the device to output the initial values of the data statement which is the subject of this invention; 14a is the initial value data take-out means to calculate the initial value assignment position and take out the value and length of the initial values; 14b is the means to store the initial values which prepare the storage table and sets the values according to the method to be explained later; 14c is the means to generate and output the object program on the basis of initial value storage table generated by the initial value storage means.

15 is the object program storage file to store the object program generated.

Next, the embodiment of this invention of initial value storage table prepared by the above-mentioned device to output the initial values of the data statement 14 is explained. This invention uses the expansion of the second method of the above-mentioned conventional technology.

Figure 9:
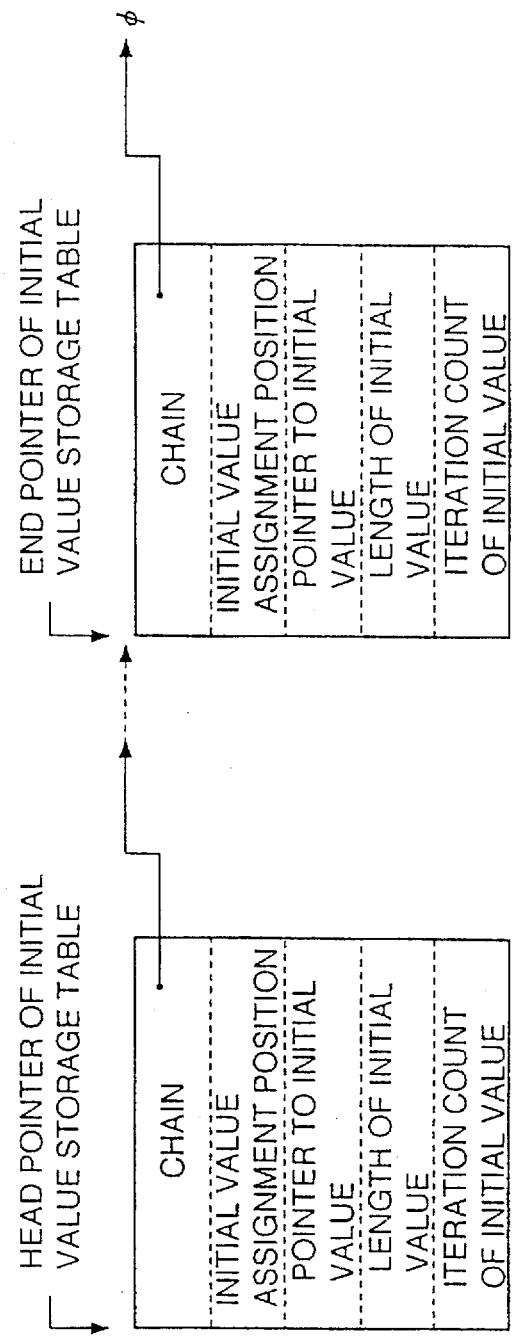
FIG. 9 is a diagram illustrating the initial value storage table of the first embodiment of the present invention.

FIG. 9 shows the first embodiment of this invention. In the first embodiment of this invention, the following information is added to the initial value storage table as shown in FIG. 9 to solve the problems of the above-mentioned second method. The pointers to the head and end of the chained initial value storage tables are also prepared.

(1) Chain of the tables;
(2) Pointer to the initial value;
(3) Initial value assignment position;
(4) Length of initial value
(5) Number of repetition of initial value In order to reduce the number of initial value storage tables, the serial initial values are expressed in one initial value storage table.

Figure 10:
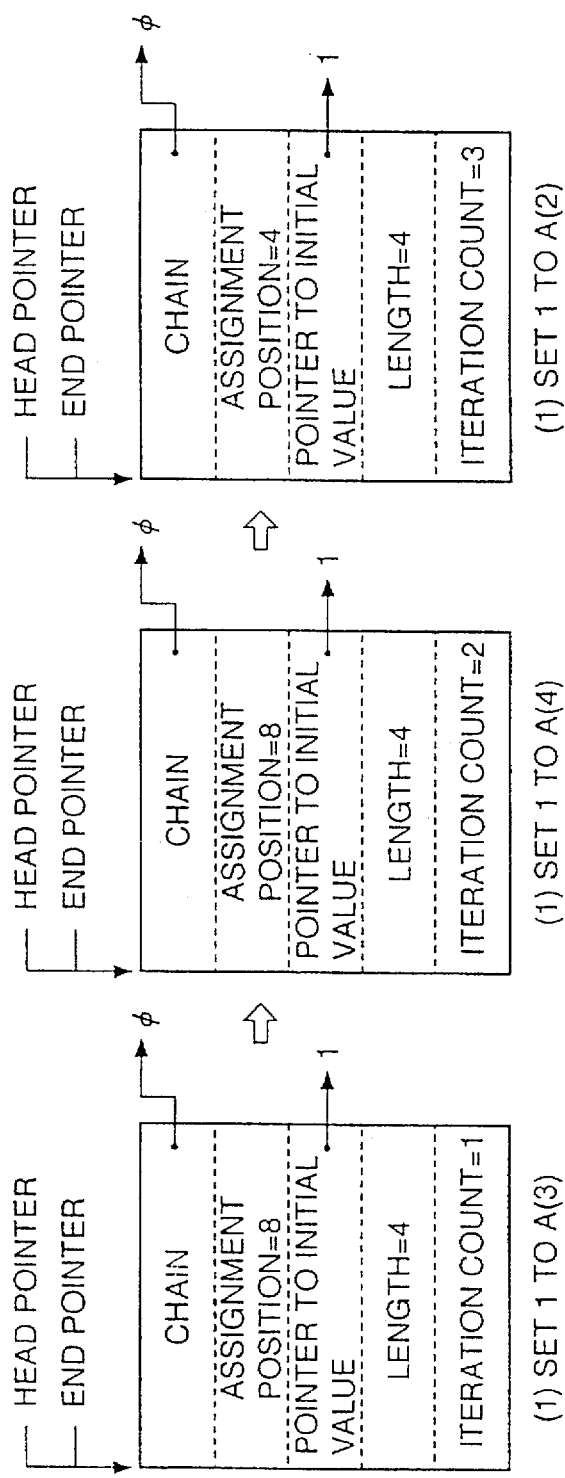
FIG. 10 is a diagram illustrating a state of storing the initial values in the first embodiment of the present invention.

For example, in the following program example, the serial initial values are saved as shown in FIG. 10.

| Example: | PROGRAM EXAMPLE 6 |
| --- | --- |
|  | INTEGER A(10) |
|  | DATA A(3), A(4), A(2) /3*1/ |

In the above example, first of all, the storage table is newly created, the address to the initial value "1" is set to the pointer to the initial value (2), and the address 8 is set to the initial value assignment position (3). In other words, assuming that one word is 4 bytes and A(1) is the address 0, A(1) is the addresses 0–3 and A(2) is the addresses 4–7, and A(3) is the addresses 8–11. The length of initial value (4) is set to the length of initial value 4 (bytes) and the iteration count of initial value (5) is set to 1 (Refer to FIG. 10 (a).)

Then, when the initial value "1" is given to A(4), this initial values are serial to the first initial value to the positive direction (in the assignment order), and their lengths and values are equal. (How to give the initial value in this way is hereafter called "to give the initial value serially to the positive direction".)

In this case, in order to store the initial value, it is sufficient to add 1 to the iteration count (5) of initial value storage table generated first (FIG. 10 (a)). Therefore, the initial value storage table becomes as shown in FIG. 10 (b).

Then, when the initial value "1" is given to A(2), the initial values are serial to the first initial value to the negative direction, and has the same length and value. (How to give the initial value in this way is hereafter called "to give the initial value serially to the negative direction".)

In this case, to store the initial value, it is sufficient to add 1 to the iteration count (5) of initial value storage table generated first and deduct the length of initial value from the initial value assignment position (3), i.e., 4. Therefore, the initial value storage table becomes as shown in FIG. 10 (c).

In other words, the initial value storage tables are accumulated in the following procedure.

(1) When there is no existing initial value storage table: Prepare a new storage table, set the pointer to the initial value (2), the initial value assignment position (3), the length of initial value (4), and the iteration count of initial value (5) (1 because of the new initial value) to the storage table generated. Because the chain of table (1) is the first one, the setting is empty. Also set the head and end pointers to the initial value storage table.

(2) When there is an existing initial value storage table and if the assignment position of the given initial value is greater than the end assignment position of the storage table indicated by the end pointer (assignment position+length× the iteration count), prepare a new storage table, and add it to the end of the chain. And, renew the end pointer so that it will indicate the storage table added.

(3) When there is an existing initial value storage table and if the assignment position of the given initial value is smaller than the end assignment position of the storage table indicated by the head pointer, prepare a new storage table, and insert it at the head of the chain. And, renew the head pointer so that it will indicate the storage table inserted.

(4) When there is an existing initial value storage table, check whether there is "the storage table which gives the initial values serially to the positive direction" or "the storage table which gives the initial values serially to the negative direction".

4)-1 When there is "the storage table which gives the initial value serially to the positive direction" among the storage tables chained, add 1 to the iteration count of the storage table.

4)-2 When there is "the storage table which gives the initial values serially to the negative direction" among the storage tables chained, add 1 to the iteration count of the storage table, and deduct the length of initial value from the assignment position.

(5) When the initial value settings are overlapped in the same area, change the initial value storage table by renewing the information of initial value storage table or dividing one initial value storage table into a plurality of initial value storage tables as needed.

(6) When there is no "storage table which gives the initial values serially to the positive or direction", prepare a new initial value storage table and make it chained in such a way that the initial value assignment position would be in the ascending order.

Figure 11:
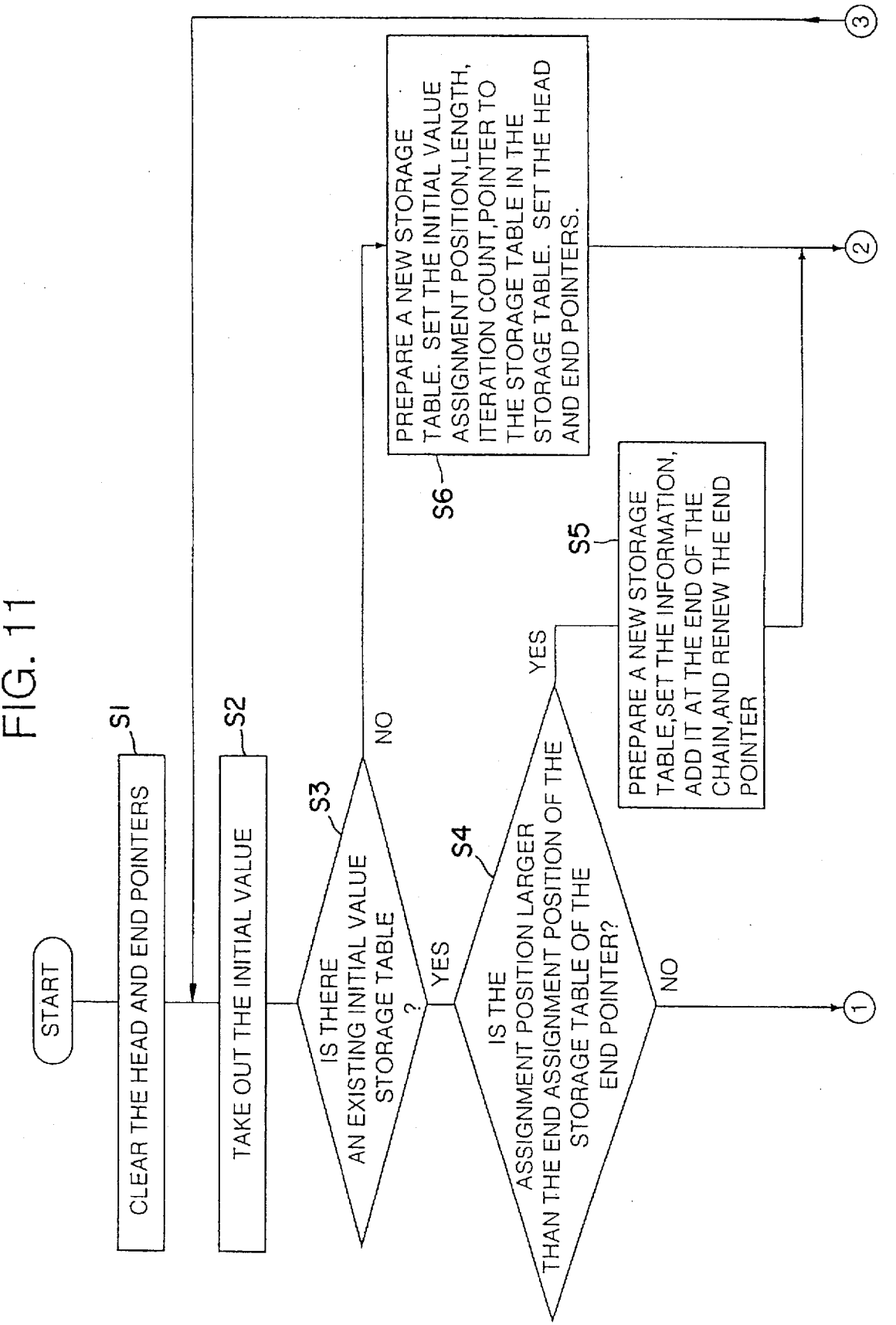
FIG. 11 is a flowchart illustrating the process of the first embodiment of the present invention.
Figure 12:
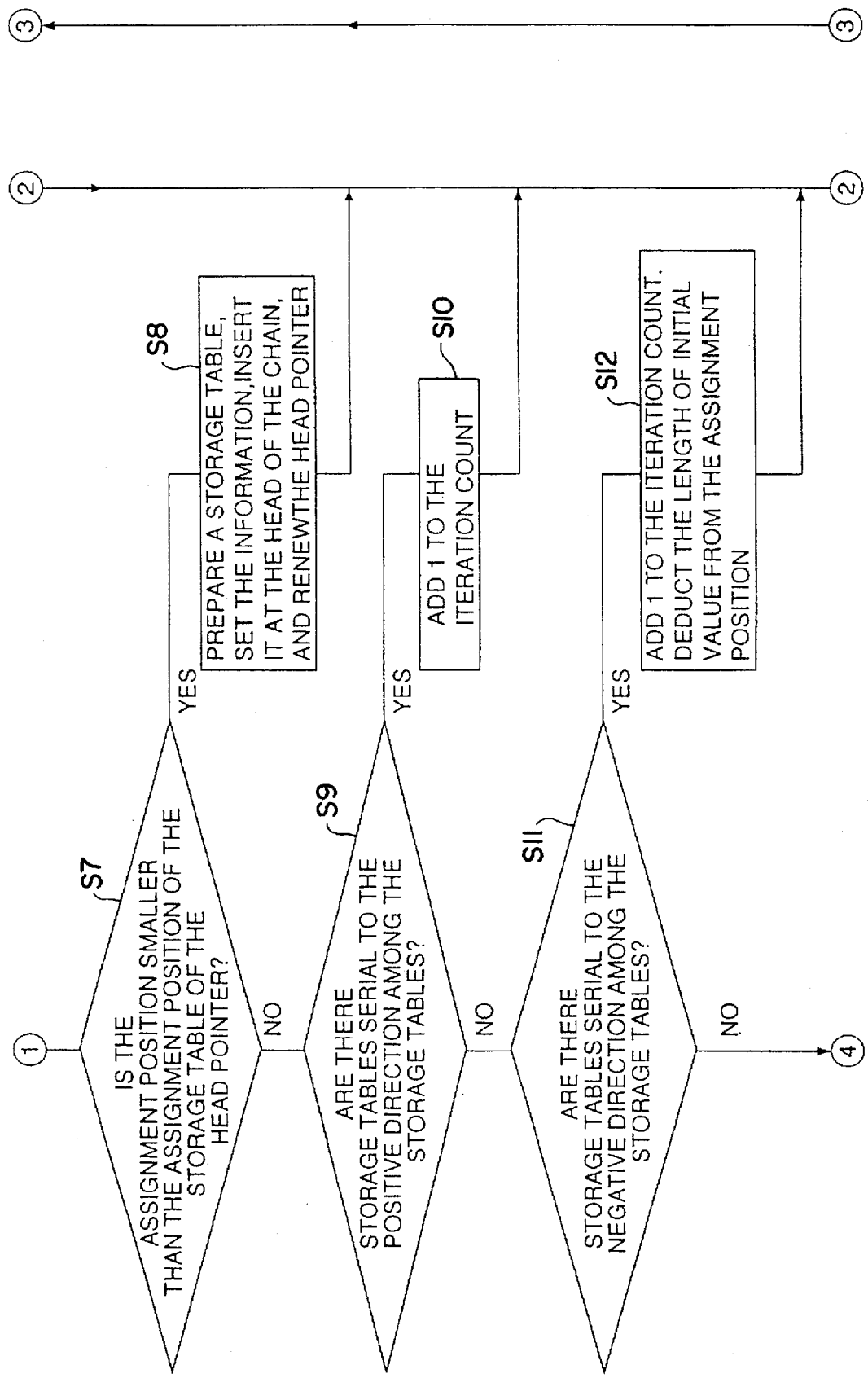
FIG. 12 is a flowchart illustrating the process of the first embodiment of the present invention (continued)
Figure 13:
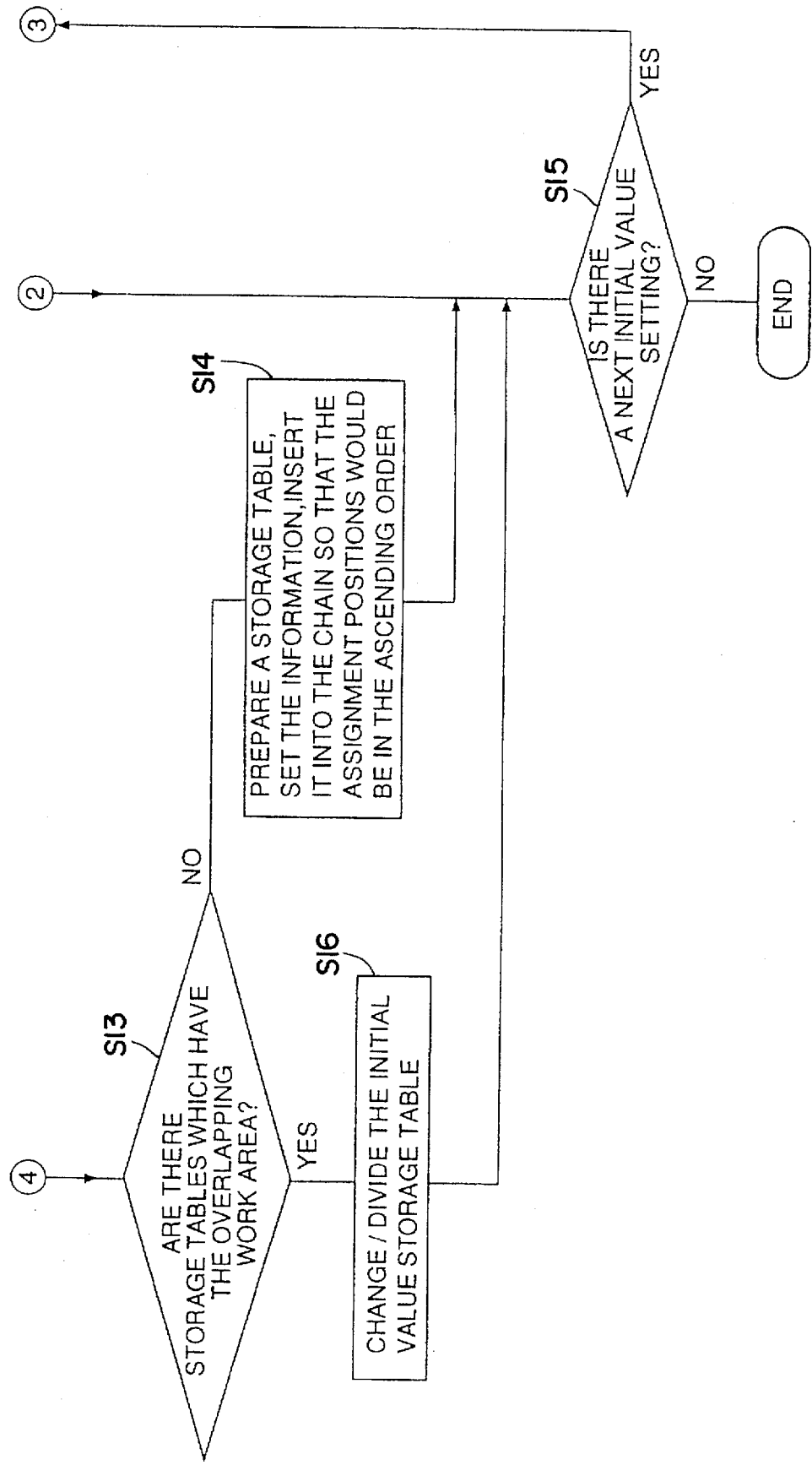
FIG. 13 is a flowchart illustrating the process of the first embodiment of the present invention (continued)

FIG. 11 through 13 show the flow charts to indicate the processing in this embodiment. The above-mentioned embodiment is explained in these figures.

Clear the head and end pointers to the initial value storage table in step S1. Take out the initial values from the intermediate program in step S2, and judge whether there is an existing initial value storage table in step S3.

When there is no existing initial value storage table, go to step S6, and prepare a new storage table. And, set the initial value assignment position ((3) of FIG. 10), the length ((4) of FIG. 10), the iteration count ((5) of FIG..10), and the pointer to the initial value (2) of FIG. 10), to the storage table prepared. Since the chain of the table (1) is the first one, the setting is empty. And, set the head and end pointers to the initial value storage table, and go to step S15 in FIG. 13.

If there is an existing initial value storage table in step S3, go to step S4, and judge whether the assignment position of the given initial value is larger than the end assignment position of the initial value of the storage table indicated by the end pointer. If yes in step S4, go to step S5, prepare a new storage table, and add it to the end of the chain. Renew the storage table so that the storage table to which the end pointer is added would be indicated, and go to step S15 of FIG. 13.

In step S4, when the assignment position of the given initial value is not greater than the end assignment position of initial value in the storage table indicated by the end pointer, go to step S7 in FIG. 12, judge whether the assignment position of the given initial value is smaller than the assignment position of the initial value in the storage table indicated by the head pointer, and if it is smaller, go to step S8, prepare a new storage table, set the information, and insert it at the head of the chain. And, renew the head pointer so that it indicates the inserted storage table, and go to step S15 of FIG. 13.

In step S7, when the assignment position of the given initial value is not smaller than the initial value assignment position in the storage table indicated by the head pointer, go to step S9, judge whether there is "the storage table which gives the initial values serially to the positive direction" among the chained storage tables, and if there is one, go to step S10, add 1 to the iteration count, and go to step S15 in FIG. 13.

In step S9, when there is no "storage table which gives the initial values serially to the positive direction" among the chained storage tables, go to step S11, judge whether there is "the storage table which gives the initial values serially to the negative direction" among the chained storage tables, and if there is one, go to step S12, add 1 to the iteration count, deduct the length of initial value from the assignment position, and go to step S15 in FIG. 13.

In step S11, when there is no "storage table which gives the initial values serially to the negative direction" among the chained storage tables, go to step S13 in FIG. 13, and judge whether there are the storage table having the overlapping areas among the storage tables. If there is none, go to step S14, prepare a new storage table, set the information, and chain the initial value assignment position in such a way that it would be in the ascending order, and go to step S15.

If there are the storage tables having the overlapping areas among the storage tables in step S13, to to step 16 and change the initial value storage table by renewing the information on the initial value storage table or dividing one initial value storage table into a plurality of initial value storage tables, and go to step S15.

In step S15, judge whether there is the next initial value setting; If there is the next initial value setting, return to step S2 in FIG. 11, and repeat the above-mentioned processing. If there is no next initial value setting, end the procedure.

In this embodiment, the number of initial value storage tables to be prepared can be reduced as mentioned above. As there are the head and end pointers indicating the positions of initial value storage table, the time to store the initial value can be shortened.

This embodiment can respond to not only the source program described in such a way to give the initial values serially, but also to the case when the initial values are given non-serially.

When the value other than 1 is described in the incremental value of the DO implied list of the data statement, the position of initial value often increase to the positive direction or decrease to the negative direction non-serially. In such a case, it is sufficient to insert the initial value storage table at the end or head, and there is no need of the operation to re-align them in the ascending order.

For example, in the following program example, the initial values are given non-serially in array A, but is increasing to the positive direction. In array B, the initial values are given non-serially, but is decreasing to the negative direction.

| Example: | PROGRAM EXAMPLE 7<br>INTEGER A(1000), B(1000)<br>DATA (A(I), I=1,1000,2) /500*1/<br>DATA (B(I), I=1000,1,−2) /500*1/<br>END |
|---|---|

In the case of the above-mentioned example, there is no need to re-align the initial value storage tables in the ascending order in generating them. It is sufficient to insert the initial value storage table at the end in array A, and at the head in array B, and there is no need to re-align them.

Figure 14:
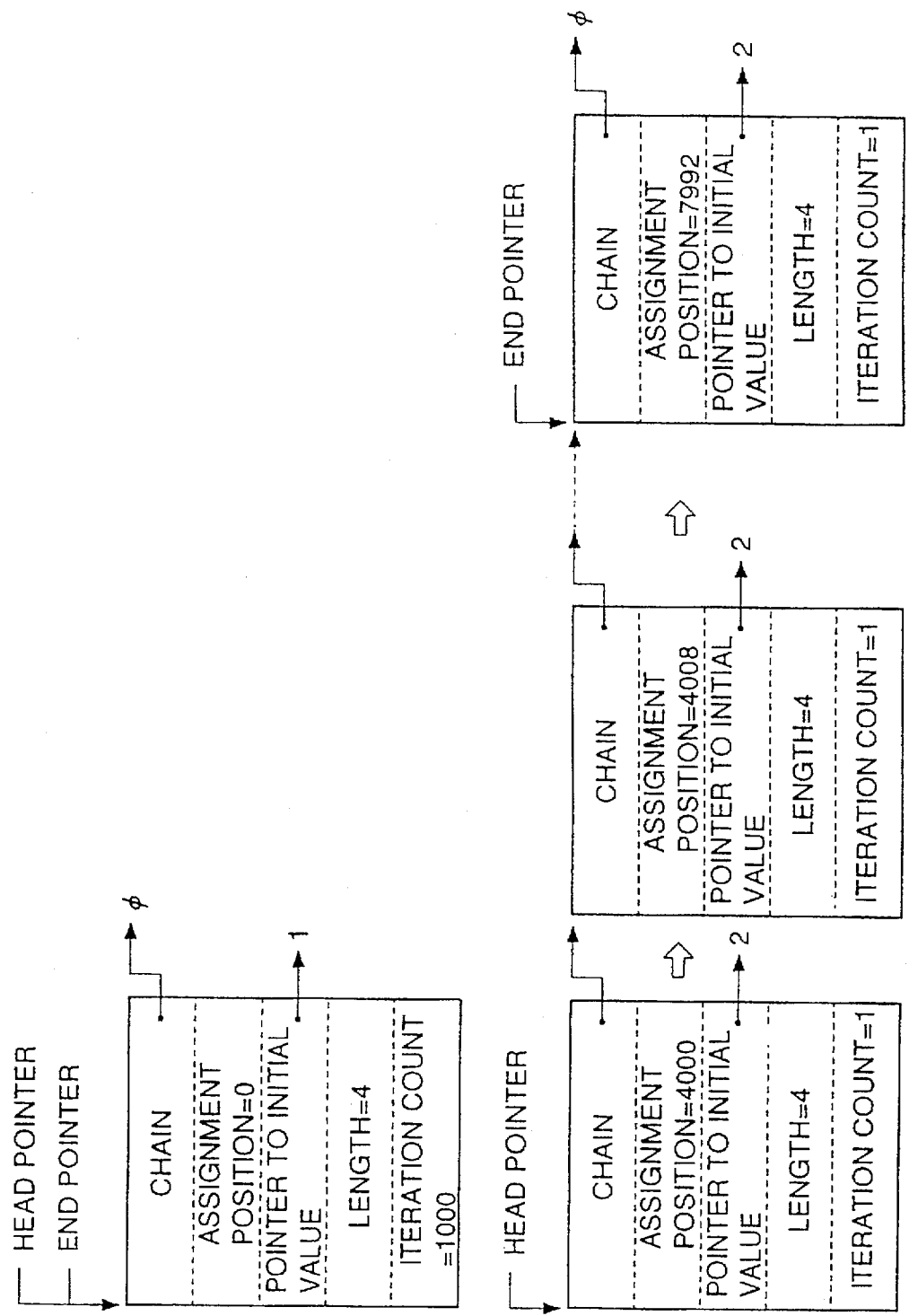
FIG. 14 is a diagram illustrating an example of storing the initial values according to the initial value storage tab, of the first embodiment.

FIG. 14 shows the example of saving the initial values according to the initial value storage table in the following program example.

| Example: | PROGRAM EXAMPLE 8<br>INTEGER A(1000), B(1000)<br>DATA A/100*1/<br>DATA (B(I), I=1,1000,2) /500*2/<br>END |
|---|---|

In FIG. 14, (a) saves the initial value of array A. The chained storage tables (500 tables) in (b) store the initial values in array B. In the initial value setting of array A, one initial value storage table (20 bytes) is made as shown in the Figure. In the case of array B, 500 storage tables are made, and it is sufficient to add them to the end without the need to re-align them.

As mentioned above, in this embodiment, the following effects can be obtained.

(a) Since the initial value storage table has the iteration count, the work area can be significantly reduced compared to the conventional ones.

Figure 2:
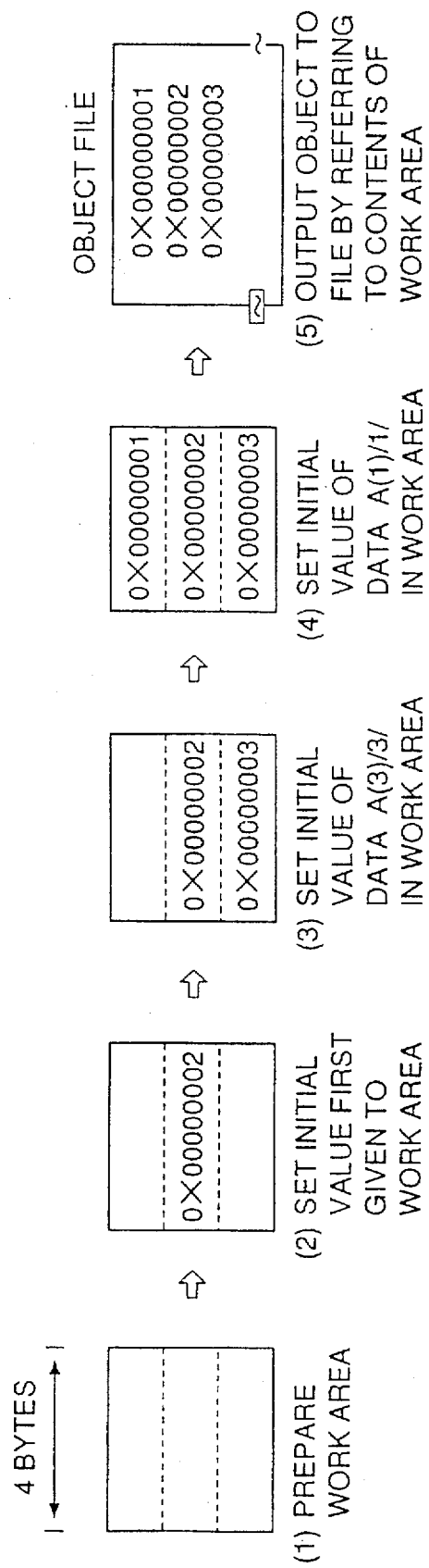
FIG. 2 is a diagram illustrating the first conventional technology to output the initial values of the data statement.
Figures 3A, 3B, 4:
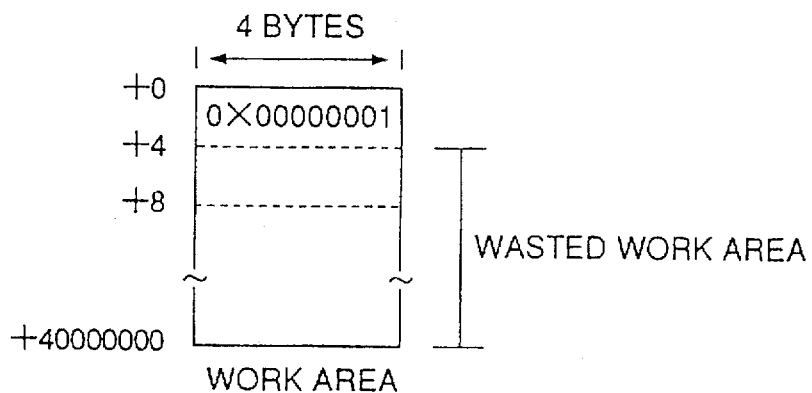
FIGS. 3A and 3B are diagrams illustrating the problem (1) of the first conventional technology.
FIG. 4 is a diagram illustrating the assembly instruction which assigns an area.
Figure 5:
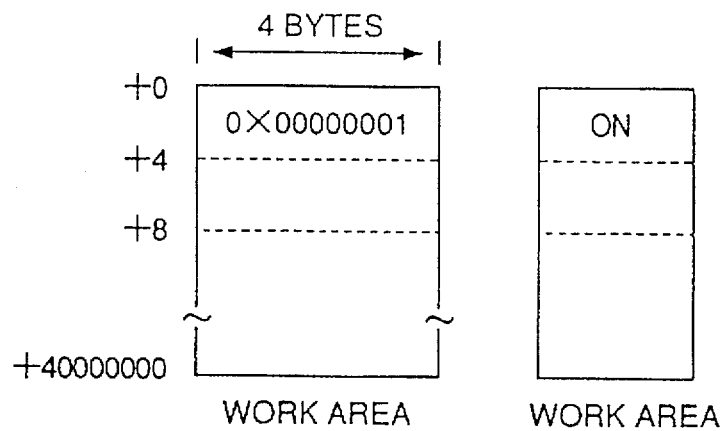
FIG. 5 is a diagram illustrating the additional information to know the initial value setting.
Figure 6:
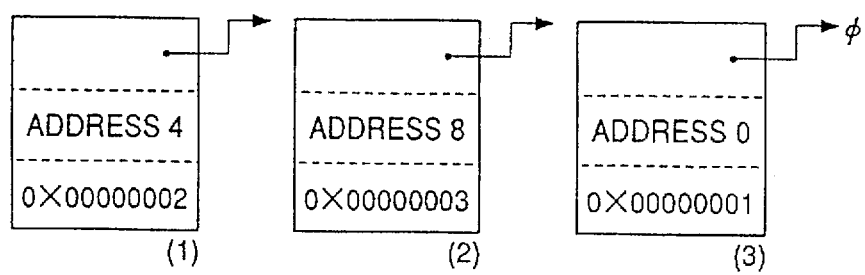
FIG. 6 diagram illustrating the second conventional technology to output the initial values of the data statement.

For example, when the initial values are given to array A in the above-mentioned PROGRAM EXAMPLE 8, the work area of minimum 4000 bytes is required in the conventional technology as mentioned above in (1). When the additional information is to be prepared as shown in FIG. 5, additional 500 bytes are required as the additional information. In the conventional technology in the above-mentioned (2), assuming that the size of one table is 12 bytes, the work area of 12×1000 bytes is required.

Against this, according to the above-mentioned embodiment, it is sufficient to use the size of one initial value storage table, i.e., the work area of 20 bytes.

(b) This embodiment does not require the time to re-align the storage tables.

For example, in array A of the above-mentioned PROGRAM EXAMPLE 8, while the conventional technology in the above-mentioned (1) and this embodiment do not require re-alignment, the conventional technology in (2) requires the time for re-alignment according to the generally known sorting algorithm.

(c) In this embodiment, the time to output the initial values to the object file can be shortened.

In other words, to output the initial value to the object file, it is necessary to refer to the work area where the initial values are saved. Since the work area to be referred to in this embodiment is small, the time to output the initial values to the object file can be shortened.

For example, in array A of the above-mentioned PROGRAM EXAMPLE 8, the above-mentioned conventional technology (1) requires to refer to 4,000 bytes (+500 bytes if there is additional information) of the work area. The above-mentioned conventional technology (2) requires to refer to the length of initial value×the number of storage tables (4×1,000 bytes) as the work area. In this embodiment, it is sufficient to refer to the length of initial value×the number of storage tables (4×1 bytes).

When the initial values are given non-serially as the initial values are given to array B in the above-mentioned PROGRAM EXAMPLE 8, this embodiment requires more work area than the conventional technology.

In other words, in the above-mentioned conventional technology (1), the work area of 4,000 (+500) bytes is required as mentioned above. In the above-mentioned conventional technology (2), the work area of 12×500 bytes is required. This embodiment requires 20×500 bytes.

In this way, setting the initial value per every other element is the most difficult case in this embodiment. However, in this embodiment, the proportion of the work area increasing from the conventional technology (1) is not large (in the conventional technology, half of the work area is wasted.), and the greater effect can be expected in other cases of setting the initial value.

As for the time for re-aligning the storage table in the above case, the conventional technology (1) requires 0 time, the conventional technology (2) requires the number of times according to the generally known sorting algorithm. The re-alignment does not occur in this embodiment as the end pointer is set.

As for the time to output the initial values to the object file in the above-mentioned case, the conventional technology (1) requires to refer to the work area of 4,000 bytes (+500 bytes). In the conventional technology (2) and this embodiment, it is sufficient to refer to the length of initial value×the number of storage tables (4×500 bytes).

As mentioned above, in the case of setting the initial values in the above-mentioned array B, 500 initial value storage tables are created in the first embodiment. In view of the re-alignment time of the storage tables and the time to output the storage tables to the object file, sufficient effect can be expected compared to the conventional technology.

However, when the initial values are set with constant intervals of space as mentioned in the above examples, the number of initial value storage tables can be reduced by improving the initial value storage tables as shown in the second embodiment.

Figure 15:
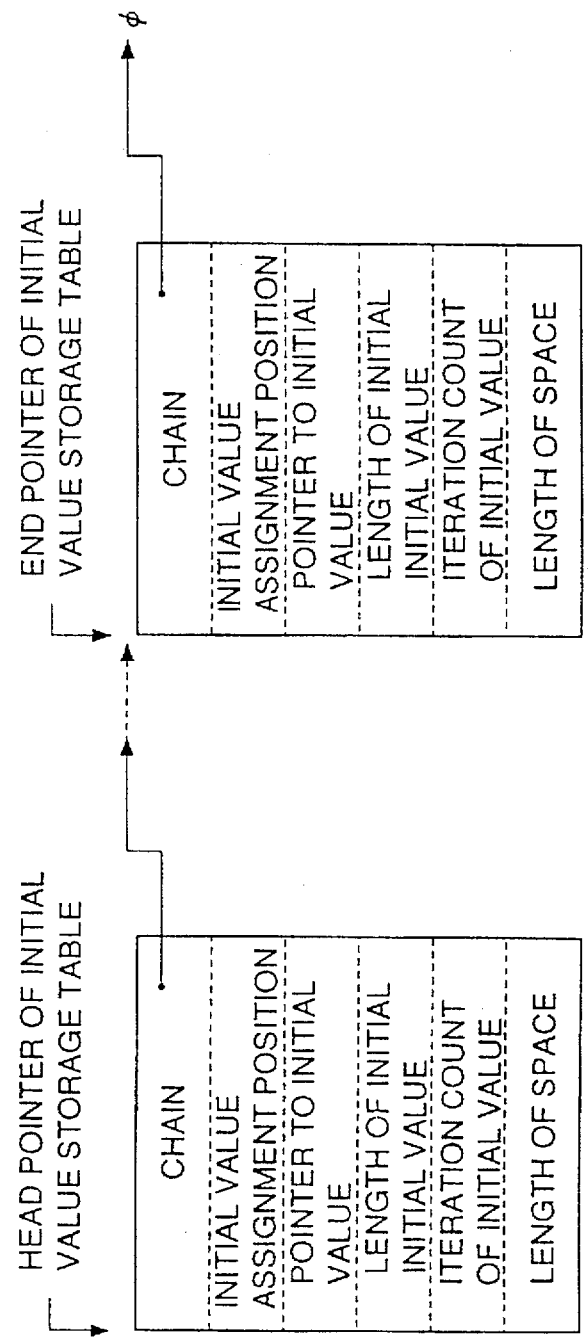
FIG. 15 is a diagram illustrating the initial value storage table of the second embodiment of the present invention.

FIG. 15 shows the initial value storage table in the second embodiment of this invention. In the Figure, the information on the "length of space" is added to the initial value storage table as shown in FIG. 9. The information on the "length of space" shows the length of area to which the initial values are not given.

Figure 16:
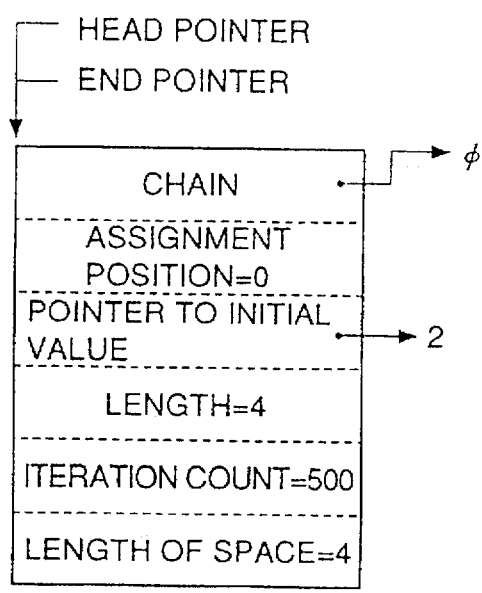
FIG. 16 is a diagram illustrating an example of having stored the initial values according to the initial value storage table of the second embodiment of the present invention.

For example, when the initial values are set with constant intervals of space as the initial values in array B of the following program example, one initial value storage table is created as shown in FIG. 16.

| Example: | PROGRAM EXAMPLE 9<br>INTEGER B(1000)<br>DATA (B(I), I=1,1000,2) /500*2/<br>END |
|---|---|

In this embodiment, the following algorithm is added to the first embodiment to reduce the number of initial value storage tables.

Figure 17:
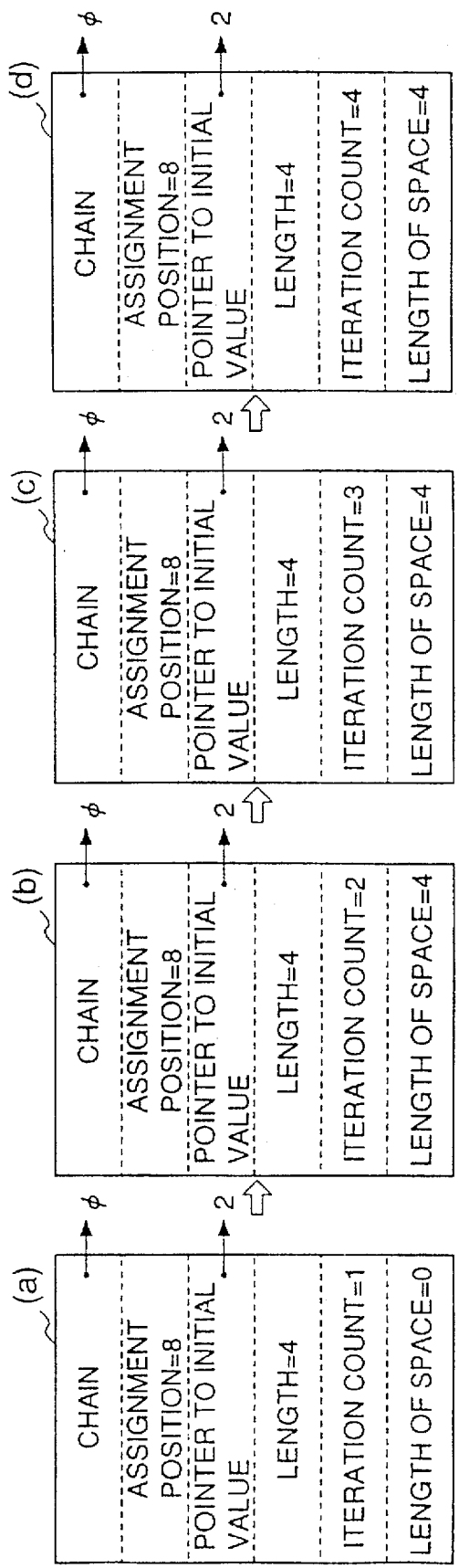
FIG. 17 is a diagram illustrating a state of storing the initial values in the second embodiment.

For example, assume that INTEGER B(10) is declared and the initial values are first given to B(3). In this case, as shown in FIG. 17, generate a new storage table, set the address to the initial value "2" to the pointer to the initial value (2), set the address 8 (B(1) is the address 0) to the initial value assignment position (3), set 4 to the length of initial value (4), set 1 to the iteration count of initial value (5), and set 0 to the length of space (6). (Refer to FIG. 17 (a).)

When the initial value "1" is given to B(5) subsequently, this initial value has the space of a certain length from the first initial value assignment position, and has the equal length and value.

In this case, in order to store the initial value, add 1 to the iteration count (5) of initial value storage table first generated, and set 4 to the length of space (6), as shown in FIG. 17 (b).

If the space is open to the negative direction, deduct (the length of initial value+the length of space) from the initial value assignment position (3). (How to give the initial values in this way is hereafter called "giving the initial values with a certain length of space open".)

When the initial values are given to B(7) subsequently, it has the space open with constant intervals to the positive direction of the previous initial value, and has the equal length and value.

In this case, in order to store the initial value, it is sufficient to add 1 to the iteration count (5) of initial value storage table first generated, as shown in FIG. 11 (c). (How to give the initial values in this way is hereafter called "giving the initial value with constant intervals of space to the positive direction".)

When the initial value 1 is given to B(1) subsequently, it has the space open with constant intervals to the negative direction of the previous initial value, and has the equal length and value. (How to give the initial values in this way is hereafter called "giving the initial values with constant intervals of space to the negative direction".)

In this case, in order to store the initial value, it is sufficient to add 1 to the iteration count (5) of initial value storage table first generated, and deduct (the length of initial value+the length of space) from the initial value assignment position (3), as shown in FIG. 17 (d).

In other words, the initial value storage tables are accumulated in the following procedure in this embodiment.

(1) When there is no existing initial value storage table: Prepare a new storage table, set the pointer to the initial value (2), the initial value assignment position (3), the length of initial value (4), the iteration count of initial value (5) (1 as it is new), and the length of space (6) (0 first) to the storage table prepared. Since the chain of table (1) is the first one, the setting is empty. Also set the head and end pointers to the initial value storage table.

(2) When there is an existing initial value storage table, and if the assignment position of the given initial value is larger than the end assignment position of initial value of the storage table indicated by the end pointer (assignment position+(the length of initial value+the length of space)×the iteration count), conduct one of the following processing:

(2)-1 When "the initial values are given with a certain length of space open" against the storage table indicated by the end pointer, add 1 to the iteration count and set the length of space.

(2)-2 When "the initial values are given with constant intervals of space open to the positive direction" against the storage table indicated by the end pointer, add 1 to the iteration count.

(2)-3 In other cases, prepare a new storage table, and add it to the end of the chain. And, renew it so that it would indicate the storage table to which the end pointer is added.

(3) When there is an existing storage table, and the assignment position of the given initial value is smaller than the initial value assignment position of initial value in the storage table, conduct one of the following processing:

(3)-1 When "the initial values are given with a certain length of space open" against the storage table indicated by the head pointer, add 1 to the iteration count, set the length of space, and deduct (the length of initial value+the length of space) from the initial value-assignment position.

(3)-2 When "the initial values are given with a constant intervals of space open to the positive direction" against the storage table indicated by the head pointer, add 1 to the iteration count, and deduct (the length of initial value+the length of space) from the initial value assignment position.

(3)-3 In other cases, prepare a new storage table, and insert it at the head of the chain. And, renew it so that it would indicate the storage table into which the head pointer is inserted.

(4) When there is an existing storage table, check whether there is "the one in which the initial values are serially given to the positive or negative direction", "the one in which the initial values are given with a certain length of space open", or "the one in which the initial values are given with a certain length of space open to the positive or negative position".

(4)-1 When there is "the one in which the initial values are serially given to the positive direction", add 1 to the iteration count of the storage table.

(4)-2 When there is "the one in which the initial values are serially given to the negative direction", add 1 to the iteration count of the storage table, and deduct the length of initial value from the assignment position.

(4)-3 When here is "the one in which the initial values are given with a certain length of space open", add 1 to the iteration count of the storage table, set the length of space, and deduct (the length of initial value+the length of space) from the initial value assignment position, if it is open to the negative direction.

(4)-4 When there is "the one in which the initial values are given with constant intervals of space open to the positive position", add 1 to the iteration count of the storage table.

(4)-5 When there is "the one in which the initial values are given with constant intervals of space open to the negative position", add 1 to the iteration count of the storage table, and deduct (the length of initial value+the length of space) from the initial value-assignment position.

(5) When the initial value settings are overlapped in the same area, change the initial value storage table by changing the information of initial value storage table or dividing one initial value storage table into a plurality of initial value storage tables as needed.

(6) When there is not "the one which the initial values are serially given to the positive or negative position", nor "the one in which the initial values are given with a certain length of space open", nor "the one in which the initial values are given with constant intervals of space open to the positive or negative position", prepare a new storage table, chain it so that the initial value assignment positions would be in the ascending order.

FIG. 18 through FIG. 23 show the flow chart indicating processing of this embodiment. The above-mentioned embodiment is explained by using these figures.

In step T1, clear the head and end pointers in the initial value storage table. In step T2, take out the initial values from the intermediate program. In step T3, judge whether there are existing initial value storage tables.

When there is no existing initial value storage table, go to step T4, and create a new initial value storage table. And, set the initial value assignment position (3) of FIG. 15), length ((4) of FIG. 15), the iteration count ((5) of FIG. 15), the length of space ((6) of FIG. 15), and the pointer to the initial value ((2) of FIG. 15) on the storage table prepared. Since the chain of tables (1) is the first one, the setting is empty. Also set the head and end pointers to the initial value storage table and go to step T22 in FIG. 21.

When there are existing initial value storage tables, go to step T5, judge whether the assignment position of the given initial value is larger than the end assignment position of initial value of the storage table indicated by the end pointer (assignment position (the length of initial value+the length of space)×the iteration count). If it is larger, go to step T6, and conduct processing for the case which is larger than the end assignment position as explained later in FIG. 22, and go to step T22 in FIG. 21.

Figure 19:
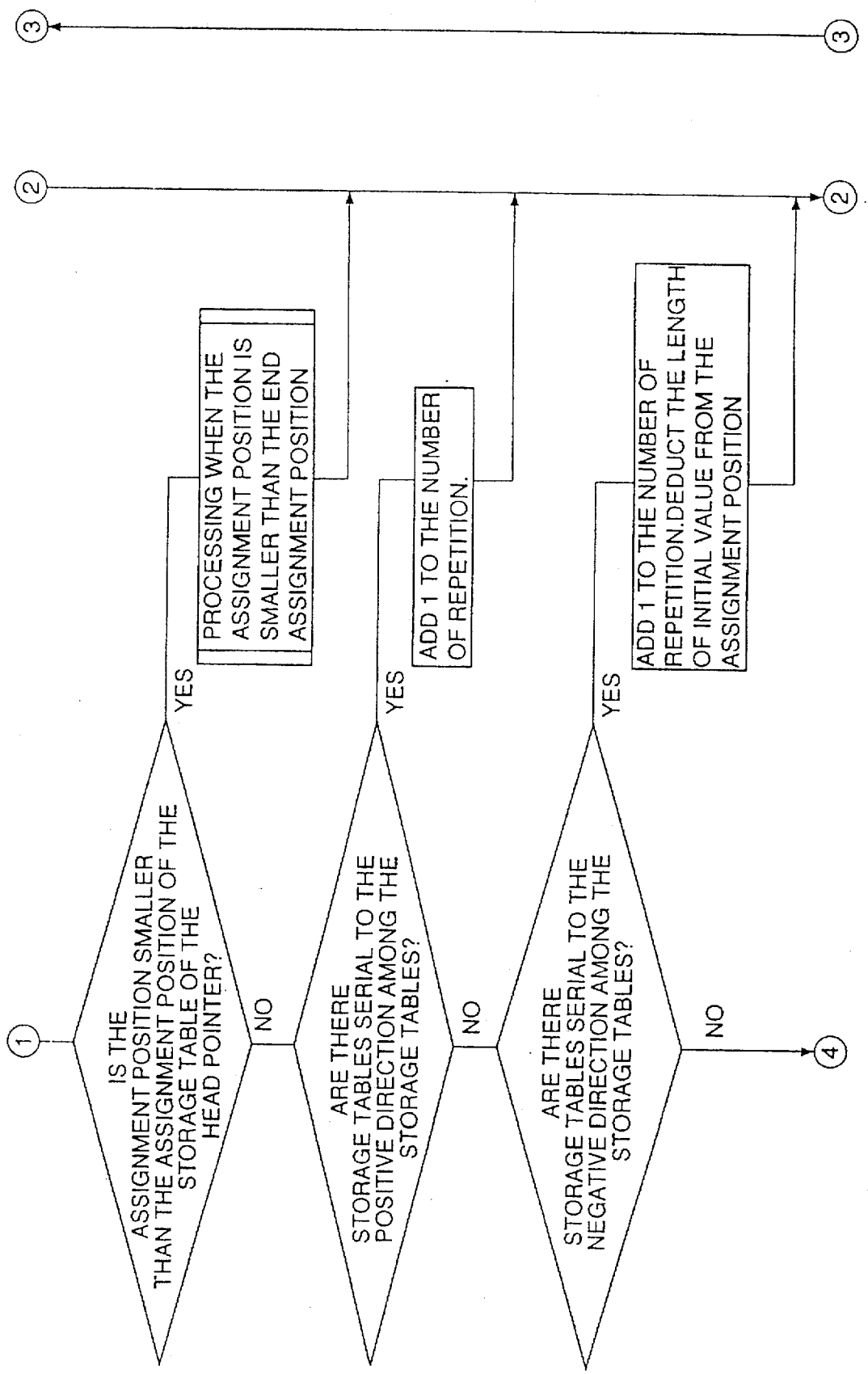
FIG. 19 is a flowchart illustrating the process of the second embodiment of the present invention (continued)

When the assignment position of the given initial value is not larger than the end assignment position of initial value of the storage table indicated by the end pointer in step T5, go to step T7 in FIG. 19, and judge whether the assignment position of the given initial value is smaller than the assignment position of initial value of the storage table indicated by the head pointer. If it is smaller, go to step T8, and conduct processing for the case where it is smaller than the head assignment position to be explained later in FIG. 23, and go to step T22 in FIG. 21.

When the assignment position of the given initial value is not smaller than the assignment position of initial value of the storage table indicated by the head pointer in step T7, go to step T9, and judge whether there is "the one in which the initial values are serially given to the negative direction" among the storage tables chained. If there is one, go to step T10, add 1 to the iteration count, and go to step T22 in FIG. 21.

When there is not the "one in which the initial values are serially given to the positive direction" among the storage tables chained in step T9, go to step T11, and judge whether there is the "one in which the initial values are serially given to the negative position" among the storage tables chained. If there is one, go to step T12, add 1 to the iteration count, deduct the length of initial value from the assignment position, and go to step T22 in FIG. 21.

Figure 20:
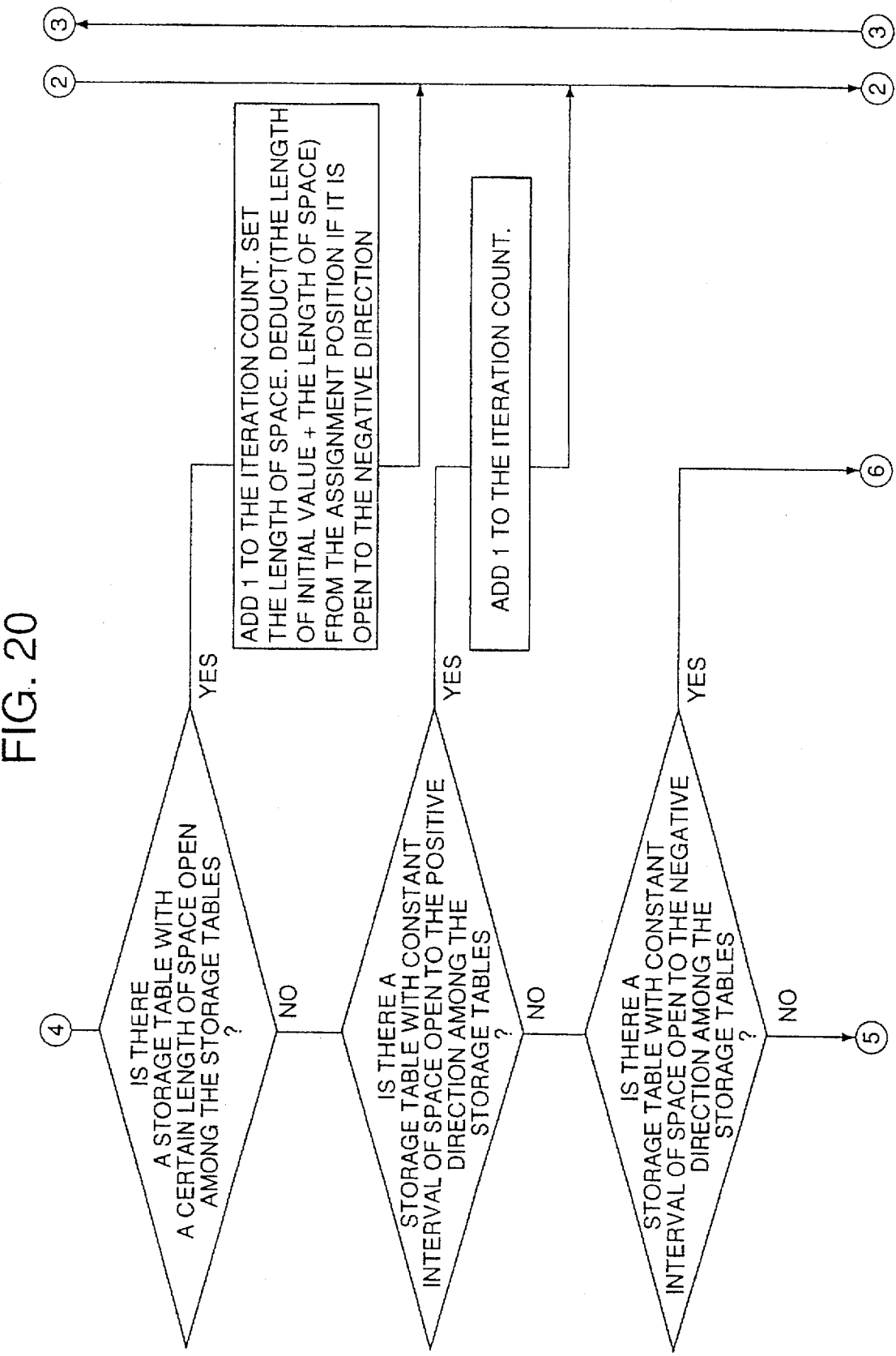
FIG. 20 is a flowchart illustrating the process of the second embodiment of the present invention (continued)

When there is not the "one in which the initial values are serially given to the negative direction" among the storage tables chained in step T11, go to step T13 of in FIG. 20, and judge whether there is the storage table which has a certain length of space open among the storage tables. If there is one, go to step T14, add 1 to the iteration count, set the length of space, deduct (the length of initial value+the length of space) from the assignment position if it is open to the negative direction, and go to step T22 in FIG. 21.

When there is not "the storage table which has a certain length of space open" among the storage tables in step T13, go to step T15, and judge whether there is the storage table which has certain intervals of space open to the positive direction among the storage tables. If there is one, go to step T16, add 1 to the iteration count, and go to step T22 in FIG. 21.

When there is not "the storage table which has constant intervals of space open to the positive direction" among the storage tables in step T15, go to step T17, and judge whether there is the storage table which has constant intervals of space open to the negative direction among the storage tables. If there is one, go to step T18 in FIG. 21, add 1 to the iteration count, deduct (the length of initial value+the length of space) from the initial value assignment position, and go to step T22.

Figure 21:
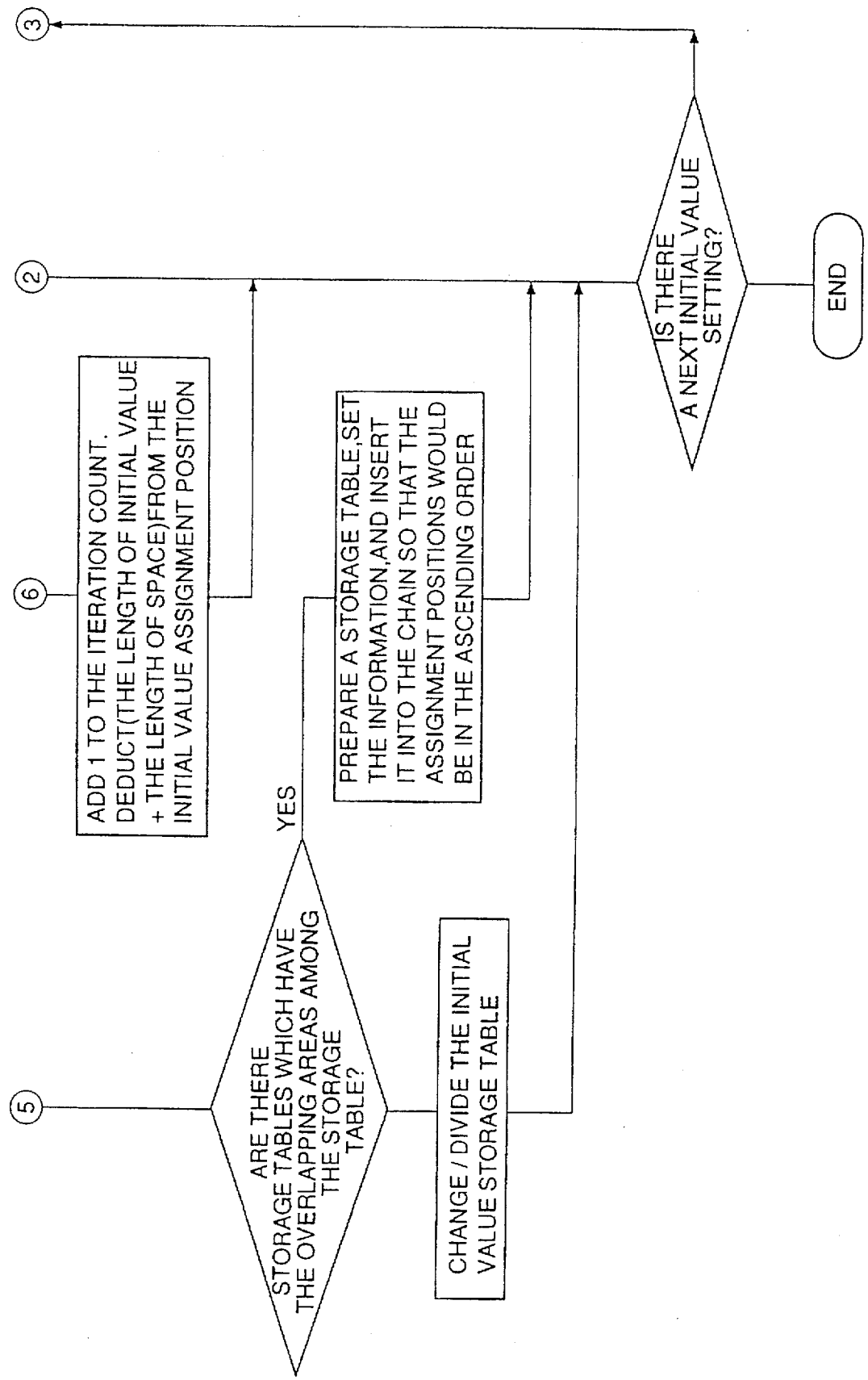
FIG. 21 is a flowchart illustrating the process of the second embodiment of the present invention (continued)

When there is not "the storage table which has constant intervals of space open to the negative direction" among the storage tables in step T17, go to step T19 in FIG. 21, and judge whether there are the storage tables which have the overlapping work area. If there is one, go to step T21, change the initial value storage table by renewing the information on the initial value storage table or dividing one initial value storage table into a plurality of initial value storage tables, and go to step S15.

When there is no "storage table which has the overlapping work area" among the storage tables, create a new storage table, set the information, chain it so that the initial value assignment position would be in the ascending order, and go to step T22.

It is determined whether there is the next initial value setting in step T22. If there is the next initial value setting, return to step T2 in FIG. 18, and repeat the above-mentioned processing. If there is no next initial value setting, end the procedure.

Figure 18:
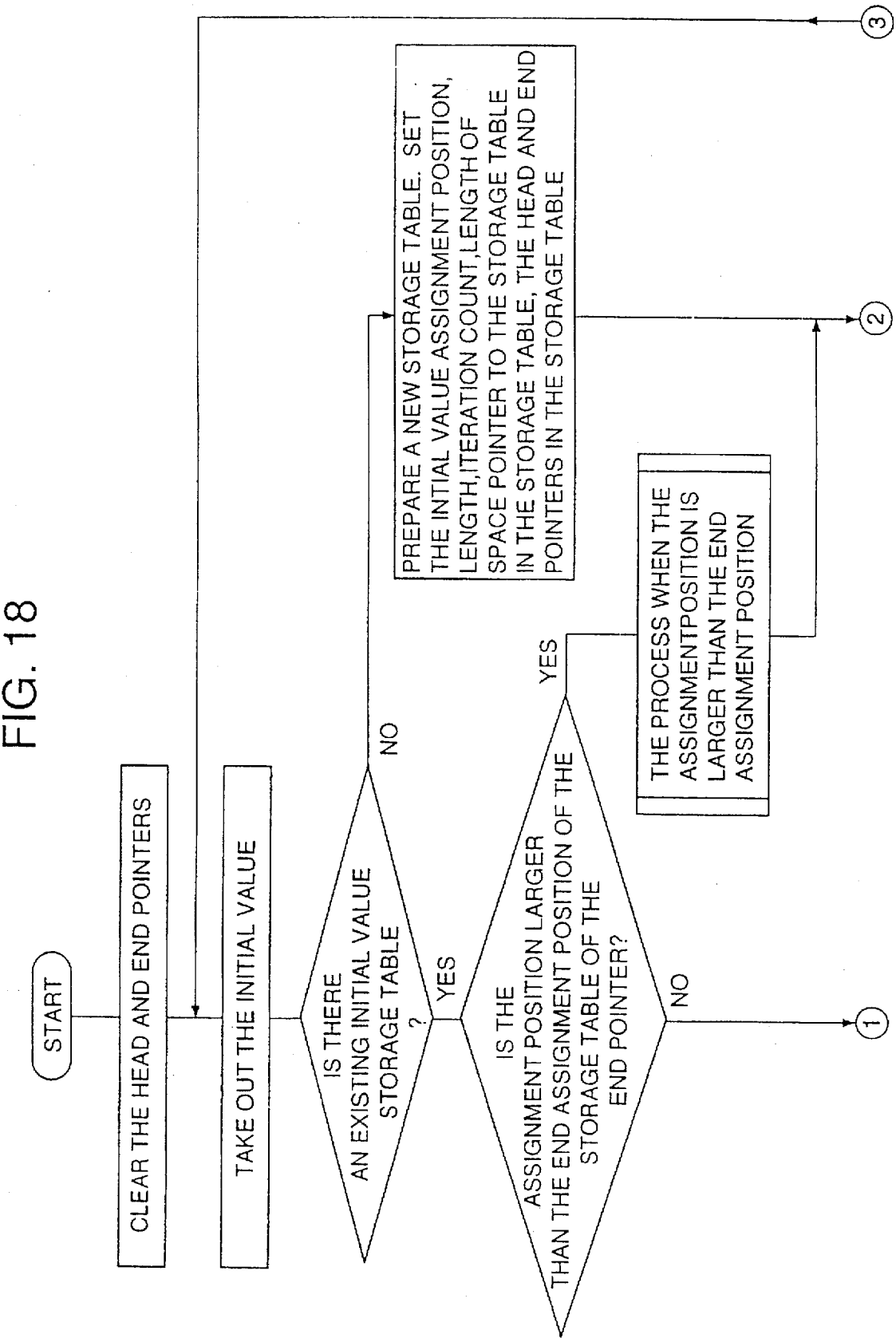
FIG. 18 is a flowchart illustrating the process of the second embodiment of the present invention.
Figure 22:
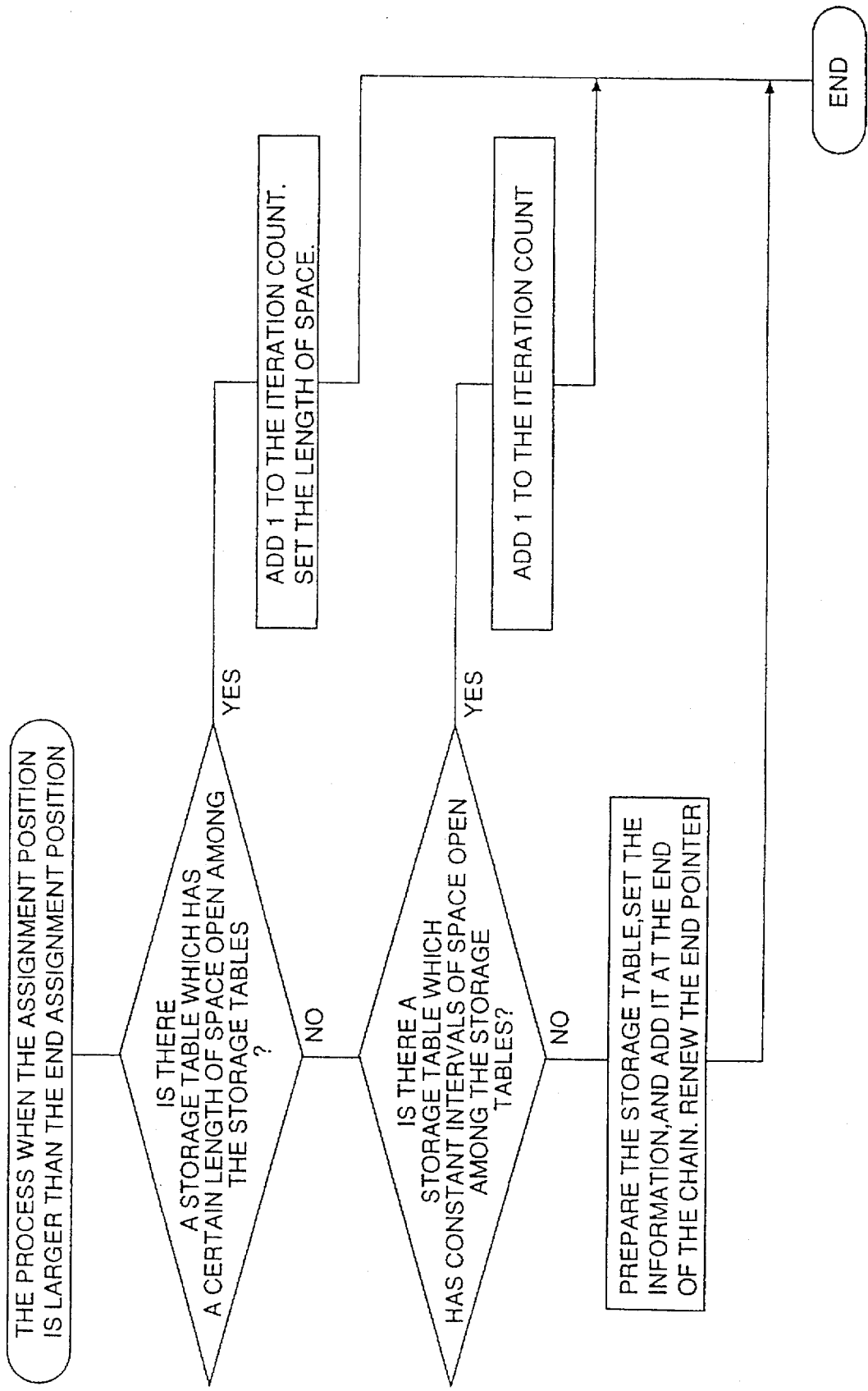
FIG. 22 is a flowchart illustrating the process of the second embodiment of the present invention (continued)

FIG. 22 shows the flow chart indicating the processing when the assignment position is larger than the end assignment position in step T6 of FIG. 18. Judge whether there is the storage table which has a certain length of space open among the storage tables in step R1. If there is one, go to step R2, add 1 to the iteration count, set the length of space, and end the procedure.

When there is no "storage table which has a certain length of space open" among the storage tables in step R1, go to step R3, and judge whether there is the storage table which has constant intervals of space open to the positive direction among the storage tables. If there is one, go to step R4, add 1 to the iteration count, and end the procedure.

When there is no "storage table which has constant intervals of space open to the positive direction" among the storage tables in step R3, go to step R5, prepare a storage table, set the information, add it to the end of the chain, renew the end pointer, and end the procedure.

Figure 23:
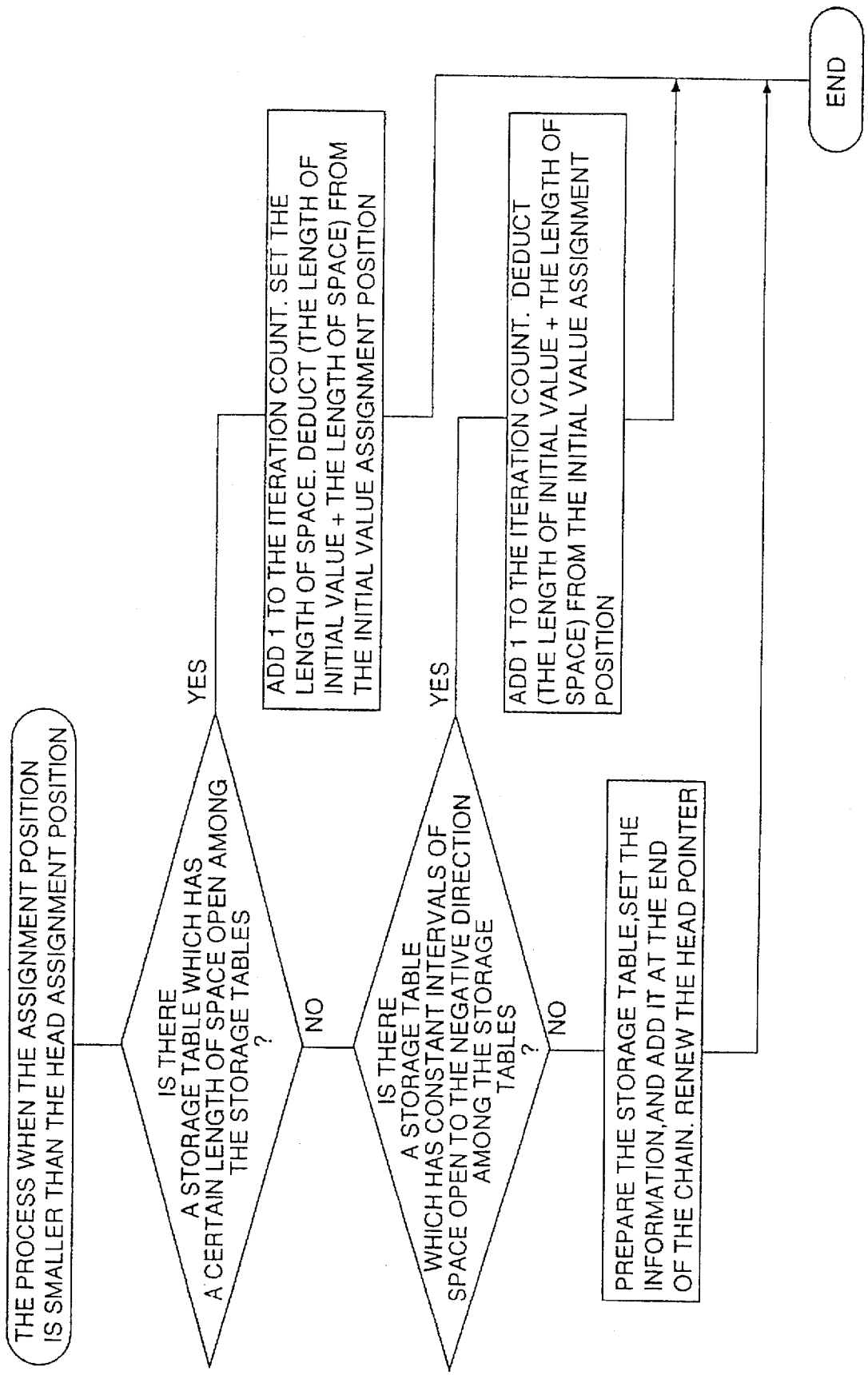
FIG. 23 is a flowchart illustrating the process of the second embodiment of the present invention (continued).

FIG. 23 shows the flow chart which indicates the processing when the assignment position is smaller than the head assignment position in step T5. Judge whether there is a storage table with a certain length of space open among the storage tables in step Q1. If there is one, go to step Q2, and add 1 to the iteration count, set the length of space, deduct (the length of initial value+the length of space) from the initial value assignment position, and end the procedure.

It is determined whether there is a storage table which has a certain interval of space open among the storage tables in step Q1. If there is none, go to step Q3, and judge whether there is a storage table which has constant intervals of space open to the negative direction among the storage tables. If there is one, go to step Q4, add 1 to the iteration count, deduct (the length of initial value+the length of space) from the initial value assignment position, and end the procedure.

When there is no storage table which has a certain interval of space open to the negative direction among the storage tables in step Q3, go to step Q5, prepare the storage table, set the information, add it to the end of the chain, renew the head pointer, and end the procedure.

As mentioned above, since the "length of space" is added to the initial value storage table in this embodiment, it can get the same effect as the above-mentioned first embodiment, and even when the initial values are set by opening constant intervals of space, the number of initial value storage tables can be reduced.

As explained above, as the initial value storage table in this invention has the iteration count, it can remarkably reduce the work area compared to the conventional one. The time to output the initial value to the object file can be also shortened.

By creating the head and end pointers to show the position of the initial value storage tables, the time to re-align the storage tables is no longer required.

Furthermore, because of the initial value storage table having the length of space, a plurality of initial values can be saved into one initial value storage table even when the initial values are given non-serially at constant intervals. The work area can be remarkably reduced compared to the conventional one in the same manner as mentioned above. The time to output the initial values to the object file can be also reduced.

The present invention is not limited to the specifically disclosed embodiments, and variations and modifications may be made without departing from the scope of the present invention.

What is claimed is:

1. A device which outputs initial values of a data statement corresponding to a source program that has been converted into an intermediate program, the intermediate program containing initial value data corresponding to the initial values of the data statement, said device comprising:

taking-out means for taking out the initial value data from the intermediate program;

initial value storing means for preparing an initial value storage table and for setting the initial value data taken out by said taking-out means in the initial value storage table; and object program output means for generating an object program based on the initial value data set in the initial value storage table, wherein, for identical initial values, the initial value storing means sets an iteration count of the identical initial values in the initial value storage table, and increases the iteration count in correspondence with the respective, identical initial values so that the identical initial values can be stored in a single initial value storage table.

2. The device as claimed in claim 1, wherein the initial value storage table prepared by the initial value storing means stores the initial value data in respective locations having a specific length of space, and the device further comprises means for setting the length of space in the initial value storage table.

3. The device as claimed in claim 2, further comprising means for retaining head and end pointers which indicate a head and an end of the initial value storage table prepared by the initial value storing means so that the initial value storage table is added to or deleted from a chain of initial value storage table by renewing said head and end pointers.

4. The device as claimed in claim 2, further comprising means for changing or dividing the initial value storage table prepared by the initial value storing means when initial value setting is repeatedly carried out for an identical area a plurality of times.

5. The device as claimed in claim 1, further comprising means for retaining head and end pointers which indicate a head and an end of the initial value storage table prepared by the initial value storing means so that the initial value storage table is added to or deleted from a chain of initial value storage table by renewing said head and end pointers.

6. The device as claimed in claim 1, further comprising means for changing or dividing the initial value storage table prepared by the initial value storing means when initial value setting is repeatedly carried out for an identical area a plurality of times.

7. A device which stores and outputs initial values of a data statement corresponding to a source program that has been converted into an intermediate program, the intermediate program containing initial value data corresponding to the initial values of the data statement, said device comprising:

taking-out means for taking out the initial value data from the intermediate program;

initial value storing means for preparing an initial value storage table and for setting the initial value data taken out by said taking-out means in the initial value storage table, wherein, for identical initial values, the initial value storing means sets an iteration count of the identical initial values in the initial value storage table, and increases the iteration count in correspondence with the number of the identical initial values so that the identical initial values can be stored in a single initial value storage table.

8. A method for storing and outputting initial values of a data statement corresponding to a source program that has been converted into an intermediate program, the intermediate program containing initial value data corresponding to the initial values of the data statement, the method comprising:

taking out the initial value data from the intermediate program;

preparing an initial value storage table;

setting the initial value data in the initial value storage table by, for identical initial values, setting an iteration count of the identical initial values in the initial value storage table, and increasing the iteration count in corresponding with the respective, identical initial values so that the identical initial values can be stored in a single initial value storage table.

9. The method as claimed in claim 8, further comprising:

storing the initial value data by the initial value storage table in respective locations having a specific length of space; and setting the length of space in the initial value storage table so that the initial values can be stored with constant intervals of space.

10. The method as claimed in claim 9, further comprising:

retaining head and end pointers which indicate a head and an end of the initial value storage table so that the initial value storage table is added to or deleted from a chain of initial value storage tables by renewing said head and end pointers.

11. The method as claimed in claim 9, further comprising:

changing the initial value storage table when initial value setting is repeatedly carried out for an identical area a plurality of times.

12. The method as claimed in claim 9, further comprising:

dividing the initial value storage table when initial value setting is repeatedly carried out for an identical area a plurality of times.

13. The method as claimed in claim 8, further comprising:

retaining head and end pointers which indicate a head and an end of the initial value storage table so that the initial value storage table is added to or deleted from a chain of initial value storage tables by renewing the head and end pointers.

14. The method as claimed in claim 8, further comprising:

changing the initial value storage table when initial value setting is repeatedly carried out for an identical area a plurality of times.

15. The method as claimed in claim 8, further comprising:

dividing the initial value storage table when initial value setting is repeatedly carried out for an identical area a plurality of times.

16. A method of storing initial values of a data statement in an initial value storage table, the initial values being sequentially arranged by the data statement and each initial value having a corresponding assignment position, the initial value storage table having an initial value pointer for pointing to a respective initial value, an initial value assignment position indicator for indicating the assignment position of a respective initial value, an initial value length indicator for indicating the length at which the initial values are to be stored in the initial value storage table and an iteration count for indicating the specific iteration of a respective initial value in the sequence of initial values, the method comprising:

reading a first initial value;

creating an initial value storage table for the first initial value and setting the initial value pointer, the initial value assignment position, the initial value length indicator and the iteration count of the initial value storage table to correspond with the first initial value;

reading a second initial value, the second initial value being the next sequential initial value after the first initial value; and when the value of the second initial value is identical to the value of the first initial value and the assignment position of the second initial value indicates that the second initial is located in a positive position with respect to the first initial value, increasing the iteration count of the initial value storage table to correspond with the second initial value.

17. A method as in claim 16, further comprising the step of:

when the value of the second initial value is identical to the value of the first initial value and the assignment position of the second initial value indicates that the second initial value is located in a negative position with respect to the first initial value, increasing the iteration count of the initial value storage table to correspond with the second initial value and deduct the length of the second initial value from the assignment position indicator.

18. A method of storing initial values of a data statement in initial value storage tables, the initial values being sequentially arranged by the data statement and each initial value having a corresponding assignment position, each initial value storage table having an initial value pointer for pointing to a respective initial value, an initial value assignment position indicator for indicating the assignment position of a respective initial value, an initial value length indicator for indicating the length at which the initial values are to be stored in the initial value storage table and an iteration count for indicating the specific iteration of a respective initial value in the sequence of initial values, a plurality of initial value storage table being chainable together in a sequential chain arrangement via a head pointer for pointing to the head of the chain and an end pointer for pointing to the end of the chain, the method comprising:

reading a first initial value;

creating a first initial value storage table for the first initial value and setting the initial value pointer, the initial value assignment position, the initial value length indicator and the iteration count of the first initial value storage table to correspond with the first initial value;

setting the head pointer and the end pointer to indicate that the first initial value storage table represents the head and the end of a chain;

reading a second initial value, the second initial value being the next sequential initial value after the first initial value;

when the assignment position of the second initial value indicates an assignment position beyond the end of the first initial value storage table as indicated by the end pointer, creating a second initial value storage table for the second initial value, setting the initial value pointer, the initial value assignment position, the initial value length indicator and the iteration count of the second initial value storage table to correspond with the second initial value, and adding the second initial value storage table to the end of the chain by setting the end pointer to indicate that the second initial value storage table is at the end of the chain;

when the assignment position of the second initial value indicates an assignment position before the head of the first initial value storage table as indicated by the head pointer, creating a second initial value storage table for the second initial value, setting the initial value pointer, the initial value assignment position, the initial value length indicator and the iteration count of the second initial value storage table to correspond with the second initial value, and adding the second initial value storage table to the beginning of the chain by setting the head pointer to indicate that the second initial value storage table is at the head of the chain.

19. A method as in claim 18, further comprising the step of:

when the assignment position of the second initial value does not indicate an assignment position beyond the end of the first initial value storage table or before the head of the first initial value storage table, the value of the second initial value is identical to the value of the first initial value and the assignment position of the second initial value indicates that the second initial is located in a positive position with respect to the first initial value, increasing the iteration count of the first initial value storage table to correspond with the second initial value.

20. A method as in claim 19, further comprising the step of:

when the assignment position of the second initial value does not indicate an assignment position beyond the end of the first initial value storage table or before the head of the first initial value storage table, the value of the second initial value is identical to the value of the first initial value and the assignment position of the second initial value indicates that the second initial is located in a negative position with respect to the first initial value, increasing the iteration count of the first initial value storage table to correspond with the second initial value and deduct the length of the second initial value from the assignment position indicator of the first initial value storage table.

* * * * *

UNITED STATES PATENT AND TRADEMARK OFFICE
CERTIFICATE OF CORRECTION

PATENT NO. : 5,734,906
DATED : Mar. 31, 1998
INVENTOR(S) : KIMURA

It is certified that error appears in the above-identified patent and that said Letters Patent is hereby corrected as shown below:

Col. 2, line 2, change "A/(2)/" to --A(2)/2/--.

Col. 4, line 12, change "tab," to --tables--;
line 39, change "FIG. 1" to --FIG. 7--;
line 40, change "7" to --1--.

Col. 7, line 46, change "this" to --the--.

Col. 8, line 44, change "FIG." to --FIGS.--.

Col. 14, line 9, after "position" insert -- + --.

Signed and Sealed this

Thirtieth Day of June, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO.   : 5,734,906
DATED        : March 31, 1998
INVENTOR(S)  : Yukihiro KIMURA It is certified that error appears in the above-indentified patent and that said Letters Patent is hereby corrected as shown below:

On the title page, the first column, in [63], change "Continuation-in-part" to --Continuation--.

Signed and Sealed this

Twenty-fourth Day of November, 1998

Attest:

BRUCE LEHMAN

*Attesting Officer*  *Commissioner of Patents and Trademarks*